United States Patent
Ikeda et al.

(10) Patent No.: US 7,575,104 B2
(45) Date of Patent: Aug. 18, 2009

(54) MECHANICAL BRAKE ACTUATOR

(75) Inventors: Takashi Ikeda, Oura-machi (JP);
Masami Fujiyama, Oura-machi (JP);
Hideyuki Takai, Oura-machi (JP)

(73) Assignee: Nisshinbo Holdings Inc, Tokyo (JP)

( * ) Notice: Subject to any disclaimer, the term of this patent is extended or adjusted under 35 U.S.C. 154(b) by 70 days.

(21) Appl. No.: 11/463,311

(22) Filed: Aug. 9, 2006

(65) Prior Publication Data

US 2007/0034461 A1    Feb. 15, 2007

(30) Foreign Application Priority Data

Aug. 9, 2005   (JP)   .............................. 2005-230683
Oct. 31, 2005  (JP)   .............................. 2005-317040

(51) Int. Cl.
*F16D 65/14* (2006.01)

(52) U.S. Cl. .................... 188/2 D; 188/106 A; 188/325

(58) Field of Classification Search ............. 188/79.55, 188/79.58, 2 D, 106 A, 325
See application file for complete search history.

(56) References Cited

U.S. PATENT DOCUMENTS 6,318,207 B1* 11/2001 Asai et al. .................. 74/502.6
6,490,946 B2* 12/2002 Ikeda ......................... 74/500.5
6,581,729 B1*  6/2003 Moriwaki ................... 188/2 D
2004/0055833 A1*  3/2004 Tatsumi et al. .............. 188/2 D

FOREIGN PATENT DOCUMENTS

JP    2001-349360 A    12/2001
JP    2004-293643 A    10/2004

* cited by examiner

*Primary Examiner*—Robert A Siconolfi
*Assistant Examiner*—Vu Q Nguyen
(74) *Attorney, Agent, or Firm*—Apex Juris, pllc; Tracy M Heims

(57) ABSTRACT

To provide the mechanical brake actuator enabling to downsize the device and to reduce the manufacturing costs of the parts. The mechanical brake actuator comprises the strut (23) which engages with one brake shoe (12) and has two facing plates (23b) with a strut-bridge (23a) connecting therebetween and the plate-like brake lever (24) which engages with the other brake shoe (13). The brake lever (24) is retained in the space (23c) between the facing strut plates and is pivotally supported on the strut (23), and the inner cable (41) of the brake cable (40) connected to the free end (24e) of the brake lever (24) via the connecting pin (43). The mechanical brake actuator which is operated by pulling the inner cable (41) comprises the clip (30), which attaches to the strut-bridge (23a) and restricts the rotation of the brake lever (24) in the cable releasing direction.

9 Claims, 19 Drawing Sheets

MECHANICAL BRAKE ACTUATOR

BACKGROUND OF THE INVENTION

1. Field of the Invention

This invention relates to a mechanical brake actuator providing an easy preventive measure for brake cable disengagement.

2. Description of the Related Art

This type of brake actuator is comprised of a plate-like brake lever, a strut pivotally retained the brake lever therein, and a pivotal pin, wherein the mechanical actuator is positioned between a pair of brake shoes, and the brake lever and the strut relatively rotates as operating, i.e., pulling a brake cable connected to the brake lever, while spreads the brake lever and the strut apart from each other in an opposite direction.

Then, after engaging the brake cable with the brake lever as inserting a connecting pin in a brake cable-connecting hole of the brake lever exposed out from an opening of the strut, a C-like bending clip attaches to an exterior of facing plates of the strut, and concaves formed on both inner surfaces of the clip engage with convexes formed on both outer surfaces of the strut to position the brake lever within the space of the strut via the clip. The basic structure of this is disclosed in the paragraphs 0015-0016 and FIGS. 2-4 of the Japanese Provisional Patent Publication No. 2001-349360.

Instead of the above-described structure, the paragraphs 0020-0023 and FIGS. 5-8 of the same reference shows that the clip is assembled on the exterior of the facing plates of the strut as rotatably attaching to the strut.

Problems to be resolved by this invention are as follows:

(1) An independent clip is more complex in assembly and leaves a possibility of losing the clip and/or to neglect the clip assembling.

(2) If the clip is assembled on the strut, a rotational axis needs to be on both outer surfaces of the strut, which increases the cost of manufacturing.

(3) Because of providing the convex and the rotational axis on the strut, high accuracy in the formation of the projection and the rotational axis (i.e., coaxially) is necessary, which requires higher manufacturing accuracy.

(4) At least, the clip plate thickness becomes easily interfering with nearby parts such as a shoe return spring adjacent to the strut.

Therefore, operability as attaching the clip to the strut is jeopardized, and there is a possibility of nearby parts being obstacles, which prevent the clip from attaching to the strut.

(5) The clip needs to be widened so as to attach to the exterior of the strut. Thus, a material cost of the clip increases, and a manufacturing cost of the clip increases due to the necessary high accuracy of providing the concave and the rotational axis in the clip (i.e., coaxially).

(6) For the independent clip, when attaching the clip to the strut, side surfaces of the clip needs to be pushed out to spread open and maintained the condition by fingers until traveling over the convex of the strut, and the respective concave of the clip is arranged to fit on the convexes of both sides of the strut, which jeopardizing the operability of the clip attaching operation.

This invention was made in consideration of the above problems, and an object of this invention is to provide the mechanical brake actuator realizing the miniaturization of the entire device and the reduction of the parts costs. Furthermore, another object of this invention is to provide the mechanical brake actuator remarkably improving the clip attaching operation.

SUMMARY OF THE INVENTION

In order to attain the above objects, a mechanical brake actuator related to this invention is characterized to comprise a strut that has two facing plates with a strut-bridge connecting therebetween and that engages with a first brake shoe, and a brake lever that engages with a second brake shoe, in which the brake lever is retained in a space between the facing plates of the strut and is pivotally supported in the strut at a proximal end thereof, and the brake lever and the strut relatively rotate to spread apart from each other while pulling a brake cable connected to a free end of the brake lever via a connecting pin, wherein a clip, which is initially attached to the strut-bridge at a retreat position thereof in an entirely movable manner, and after connecting the brake cable to the brake lever, the entire clip is moved on the strut-bridge in a forwarding direction parallel to said facing plates so as to be lastly attached to the strut-bridge at a progress position thereof, thereby restricting a rotation of the brake lever in a cable releasing direction. In this invention, simply attaching the small size clip to the strut-bridge restricts the rotation of the brake lever in the cable releasing direction, thereby surely preventing the disengagement of the brake cable from the brake lever.

Furthermore, this invention is characterized in that the above-described mechanical brake actuator is structured such that the clip has a pair of legs that clip on the strut-bridge.

Still further, this invention is characterized in that the above-described mechanical brake actuator is structured such that the clip enfolds the strut-bridge.

Still further, this invention is characterized in that the above-described mechanical brake actuator is structured such that the clip has a positioning portion on one of the legs that restricts the rotation of the brake lever in the cable releasing direction by abutting the positioning portion against the brake lever.

Still further, this invention is characterized in that the above-described mechanical brake actuator is structured such that the clip slidably clips on the strut-bridge.

Still further, this invention is characterized in that the above-described mechanical brake actuator is structured such that the clip and the strut-bridge have first and second male and female engagements, and the clip engages the strut-bridge at the first male and female engagement when the clip is at the retreat position and engages the strut-bridge at the second male and female engagement when the clip is at the progress position.

Still further, this invention is characterized in that the above-described mechanical brake actuator is structured such that a connecting operation of the brake cable, the brake lever, and the connecting pin is possible when the clip is in a retreat position, and the clip restricts the rotation of the brake lever so as to disable the connecting operation of the brake cable, the brake lever, and the connecting pin when said clip is in a progress position.

Still further, this invention is characterized in that the above-described mechanical brake actuator is structured such that the clip rotatably attaches to the strut-bridge.

Still further, this invention is characterized in that the above-described mechanical brake actuator is structured such that the clip and the strut-bridge have a male and female engagement, and the clip attaches to the strut-bridge as fitting the male and female portion.

Still further, this invention is characterized in that the above-described mechanical brake actuator is structured such that the clip clips on the front and rear end edges of the strut-bridge.

Yet further, this invention is characterized in that the mechanical brake actuator is structured such that the connecting operation of the brake cable, the brake lever, and the connecting pin is possible when the clip is at a position in the cable releasing direction side, and the clip restricts the rotation of the brake lever to disable the connecting operation of the brake cable, the brake lever, and the connecting pin when the clip is at a position in the cable operating direction side.

This invention has the following advantages.

(1) When the clip attaches to the strut so as to restrict the rotation of the brake lever in the cable releasing direction, the convexes on both outer surfaces of the strut are not necessary, which downsizes the entire width of the strut.

(2) Because the clip attaches to the strut-bridge, the clip does not interfere with the nearby parts adjacent to the strut.

(3) The attaching operability of the clip can be improved by simple operation of attaching the clip to the strut-bridge.

(4) The position of the positioning portion of the clip for determining the position of the brake lever can be changed by simple operation of sliding or rotating the clip while fitting on the strut-bridge, thereby facilitating the operation of engaging and disengaging the cable end with/from the brake lever.

(5) The clip attaches to the strut-bridge, which can downsize the clip and manufacturing by simple bending process, thereby decreasing the material cost and the manufacturing cost of the clip.

(6) When the clip enfolds the strut-bridge of the strut, no additional processing is necessary to the strut.

(7) When the clip rotatably attaches to the strut-bridge, the clip can be further downsized and manufactured by simple bending process, thereby decreasing the material cost and the manufacturing cost of the clip.

Furthermore, when the clip attached to the strut-bridge is rotated by fingers to restrict the rotation of the brake lever in the cable releasing direction, the attaching sound and the resulted vibration make an operator to hear and feel the operation, thereby confirming the clip installation.

BRIEF DESCRIPTION OF THE DRAWINGS

The above and other objects of the present invention will become readily apparent by reference to the following detailed description when considered in conjunction with the accompanying drawings wherein.

PREFERRED EMBODIMENTS OF THE INVENTION

Embodiment 1

In the following sections, a mechanical brake actuator relating to this invention will be explained.

Figure 1:
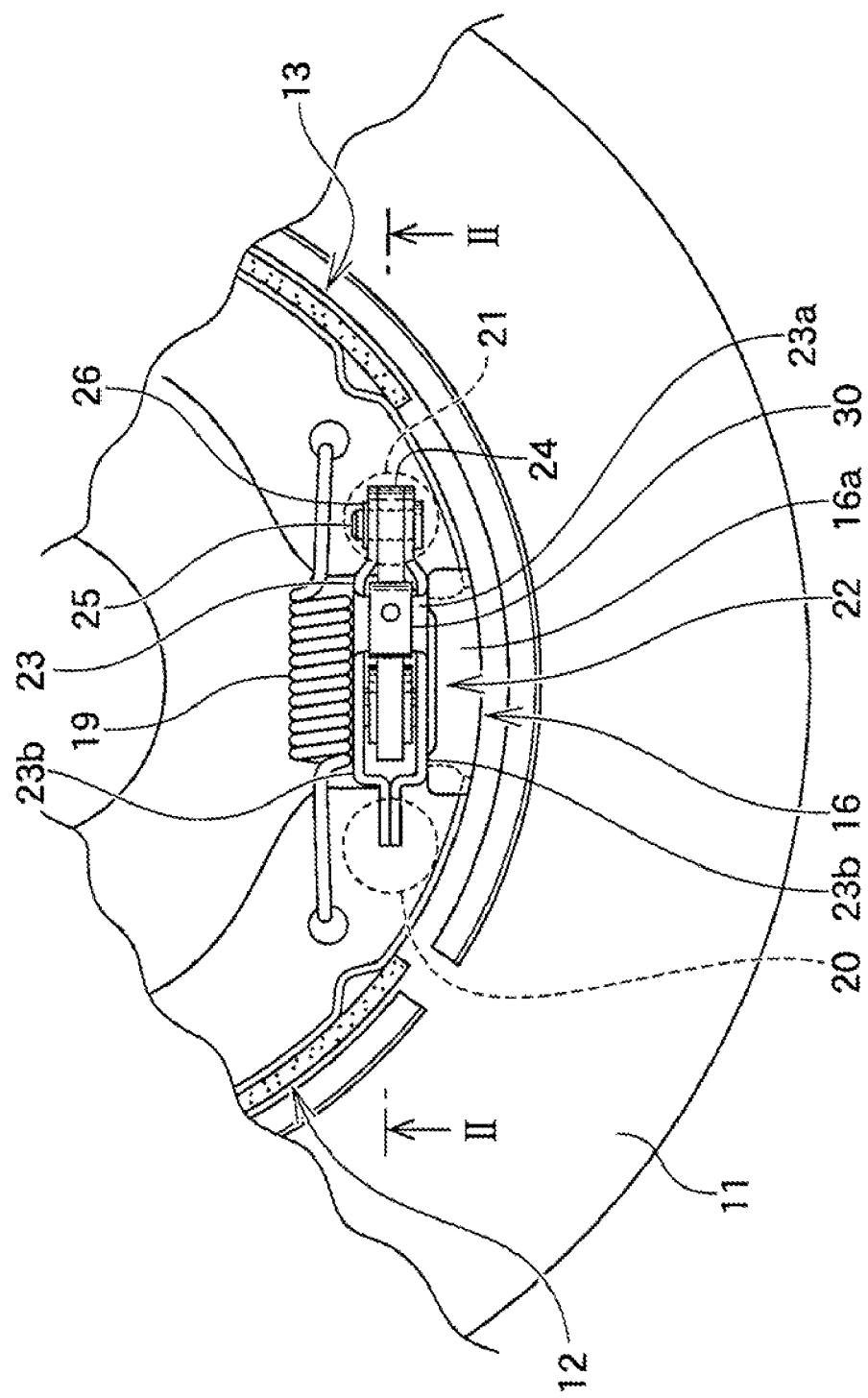
FIG. 1 is a plan view of an example of the dram brake with the mechanical brake actuator according to the first embodiment.
Figure 2:
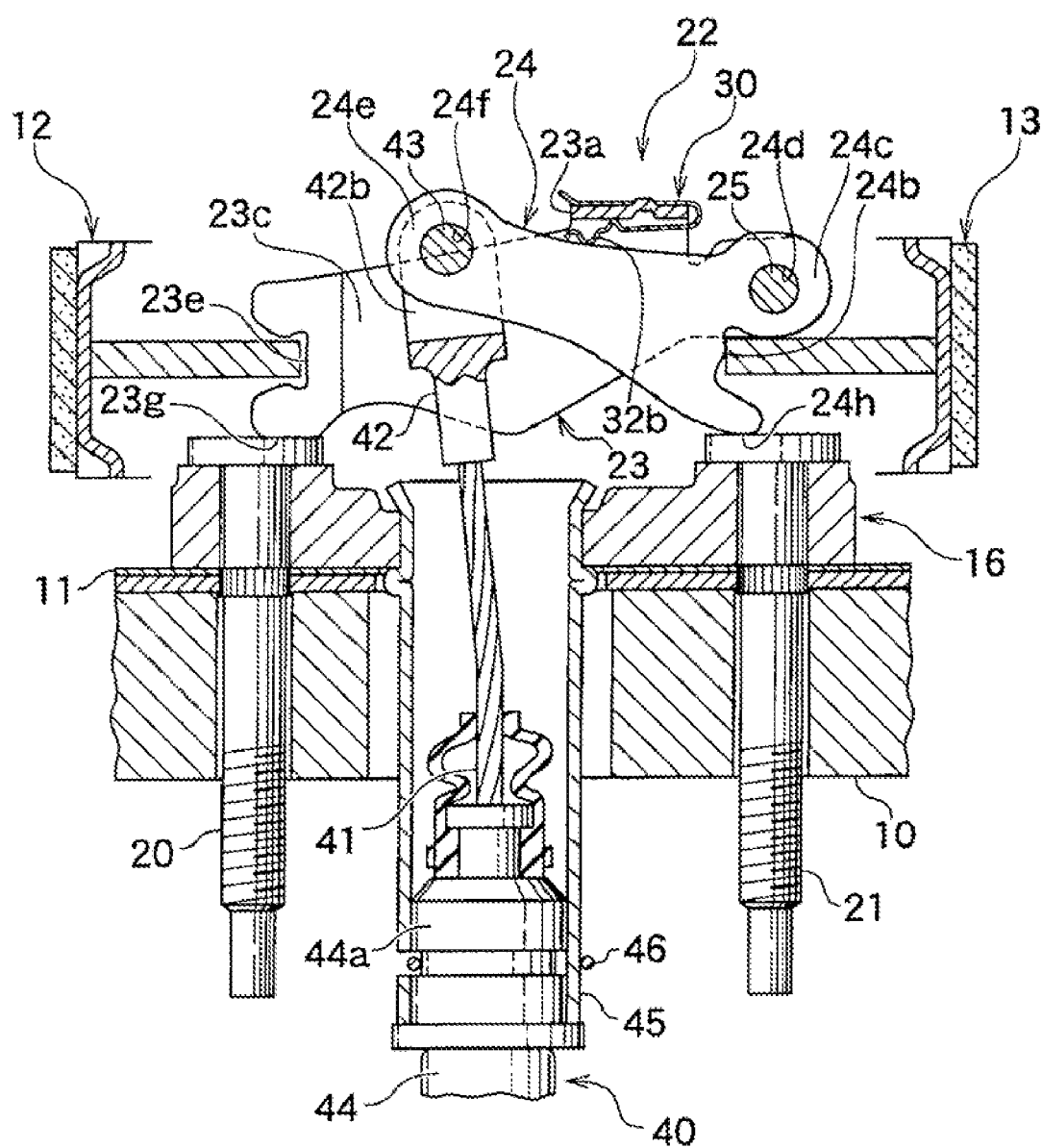
FIG. 2 is a cross section view of FIG. 1 taken along the line II-II.
Figure 3:
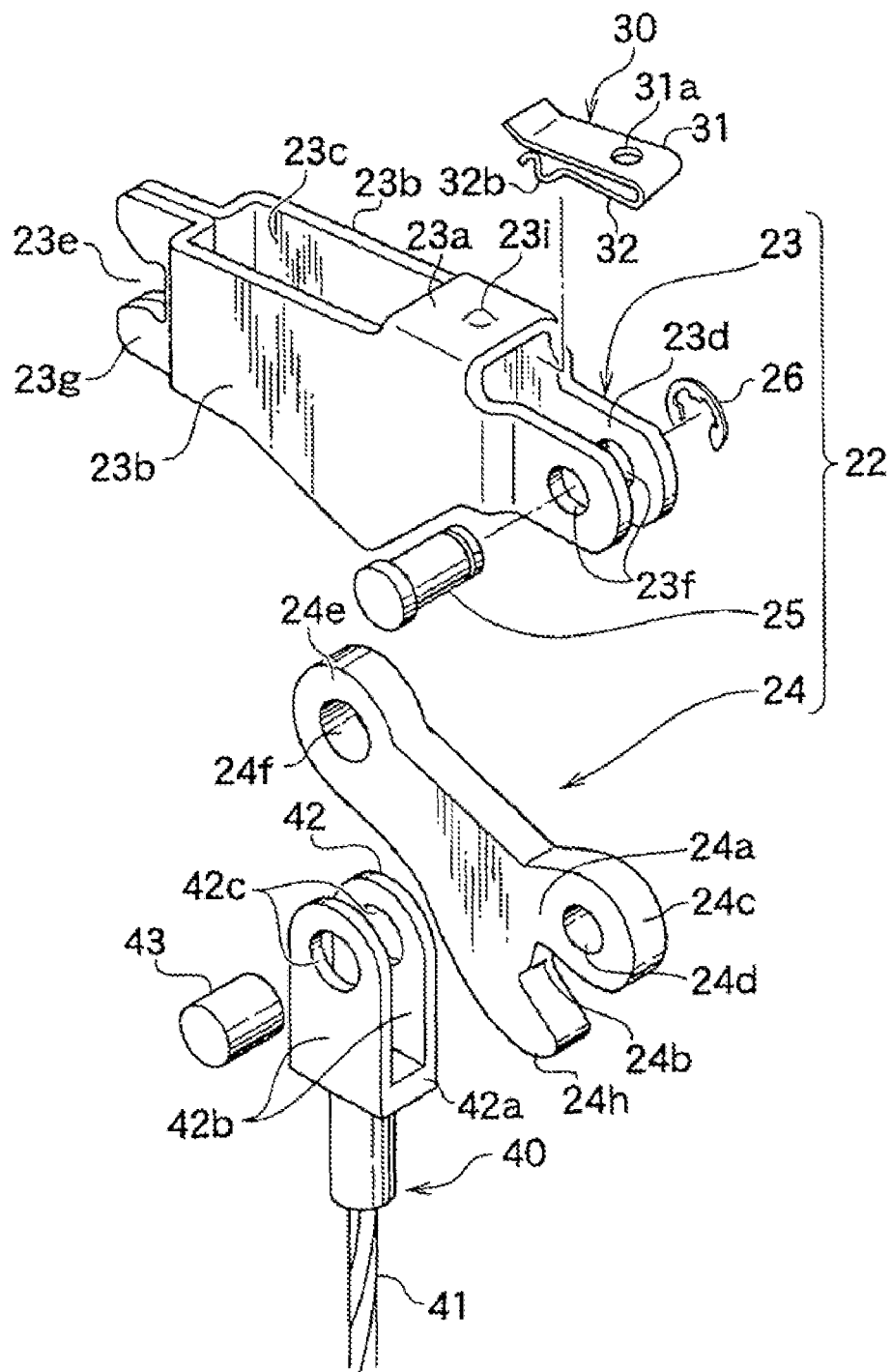
FIG. 3 is an exploded perspective view of the mechanical brake actuator according to the first embodiment.

FIG. 1 is a plan view of an example of the drum brake device with the mechanical brake actuator, FIG. 2 is a cross-sectional view of FIG. 1, and FIG. 3 is an exploded perspective view of the above-described mechanical brake actuator.

The first embodiment of this invention will be explained with reference to the drawings.

A pair of brake shoes 12 and 13 are movably mounted, via a shoe hold mechanism (not shown in the figures), on a back plate 11 which is fixed on a stationary portion 10 of a vehicle, and one pair of facing ends of the brake shoes 12 and 13 are supported by raised portion 16a of a later described anchor 16 while the other pair of facing ends thereof are connected via a joint member. A pair of shoe return springs (where only one shoe return spring 19 of the two shoe return springs appears in the figure), extended between both brake shoes 12 and 13, maintains a condition of abutment between both ends of both brake shoes 12 and 13 and joint member and between both ends and the anchor 16.

A mechanical actuator 22 which expands one ends of both brake shoes 12 and 13 is comprised of a strut 23, a brake lever 24, a pivot pin 25, and a washer 26, which is positioned adjacent to the raised portion 16a of the anchor 16 between both brake shoes 12 and 13.

Furthermore, the strut 23 is designed such that a space is reserved therein to surround the brake lever 24 and that a strut-bridge 23a connects two facing plates 23b, 23b of the strut 23 so that a clip 30 for restricting the rotation of the brake lever 24 attaches to the strut-bridge 23a.

The strut 23 as a component of the mechanical actuator 22 is made of one piece of plate, which is folded to make C-shape with two facing plate 23b, 23b and has the strut-bridge 23a at an intermediate portion of the strut 23 in a longitudinal direction. Furthermore, one ends of the facing plates 23b and 23b are superposed each other to be fixed such as by welding. A wider space (clearance) 23c reserved at a central region in the longitudinal direction between the two facing plate 23b, 23b while a narrower space (clearance) 23d than the space 23c is continuously formed at the other ends thereof. A shoe engagement groove 23e is formed at the superposing portion at one end of the facing plates 23b, 23b while pivotal holes 23f, 23f are formed at the other end thereof.

The strut bridge 23a, bridging over upper portions of the facing plates 23b, 23b, closes one section of the wider space 23c. The strut-bridge 23a and the brake lever 24 are interrelated such that the brake lever 24 does not abut against the strut-bridge 23a until a brake cable connecting hole 24f formed at a free end 24e of the brake lever 24, in its entirety, becomes exposed out from the wider space 23c of the strut 23. Because of the above-described structure, in particular the function of the clip 30, a cable end 42 fixed at an end of an inner cable 41 does not physically disengage from the brake lever 24 during the transportation of the drum brake device.

Figure 4:
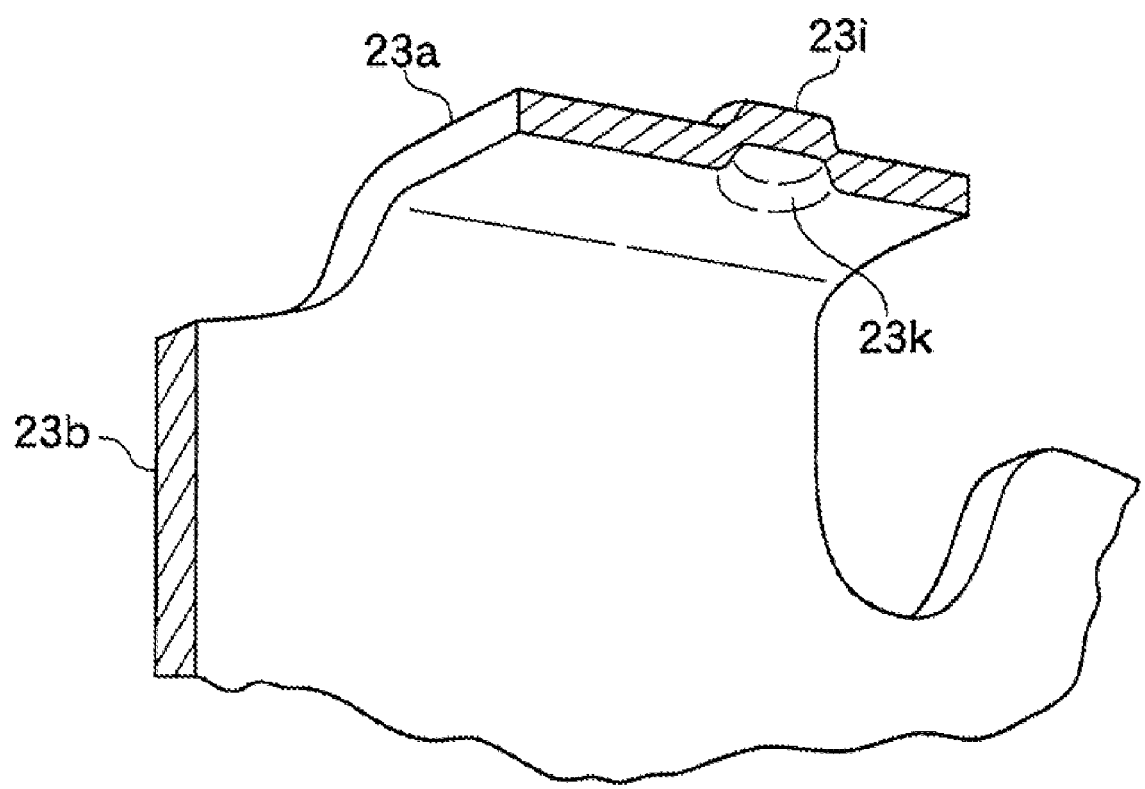
FIG. 4 is a partially omitted perspective view of the strut-bridge of the strut.

As shown in an enlarged view of FIG. 4, an outer and an inner surface of the strut-bridge 23a, as a portion which the later described clip 30 attaches, has a convex 23i as a male portion and a concave 23k as a female portion. These convex 23i and concave 23k function to position the clip 30. Although when the convex 23i and the concave 23k are formed on a coaxial line on the strut-bridge 23a, both convex 23i and the concave 23k can simultaneously be formed by one press working, the positions of the convex 23i and the concave 23k are not limited to be on the coaxial line and may be shifted in the longitudinal direction of the strut 23.

The brake lever 24 as the one component of the mechanical actuator 22 is made of one piece of plate and positioned in the spaces 23c, 23d of the strut 23 so as to be retained therein. A shoe engagement groove 24b is formed in a proximal portion 24a of the brake lever 24, while a pivot hole 24d, though which a pivot pin 25 is penetrated, is formed in an upper leg 24c. The pivot pin 25 is penetrated thorough pivot holes 23f, 24d, 23f of the strut 23 and the brake lever 24 and a washer 26 is clipped on an end of the pivot pin 25, thereby pivotally supporting the brake lever 24 relative to the strut 23. The brake lever 24 is restricted its clockwise rotation in FIG. 2 as its end surface abutting against the strut-bridge 23a or the clip 30 attaches to the strut-bridge 23a. The brake cable connecting hole 24f is formed at a free end 24e of the brake lever 24, through which a connecting pin 43 to connect the cable end 42 fixed to the end of the inner cable 41 as a component of a later described brake cable 40.

Also, the strut 23 and the brake lever 24, which constitute the mechanical actuator 22, have lower legs 23g and 24h at a cable operation side, which are slidably located on the heads of installation bolts 20, 21 as shown in FIG. 2.

The clip 30 is a member restricting the clockwise rotation in FIG. 2 of the brake lever 24 and slidably clips on the strut-bridge 23a.

Figure 5:
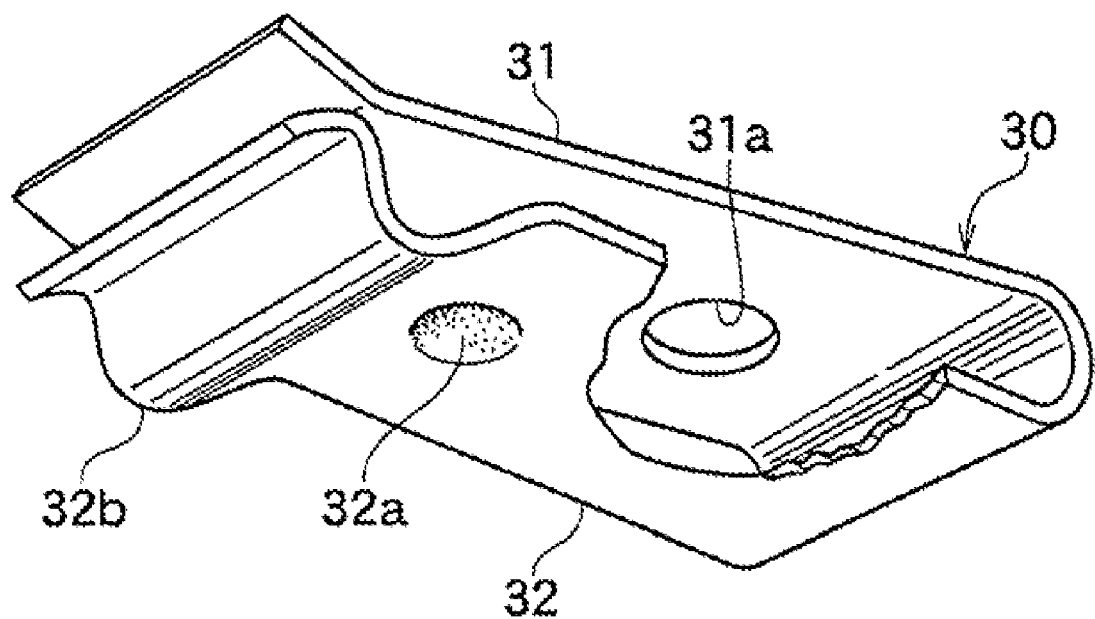
FIG. 5 is a perspective view of a partially broken clip according to the first embodiment.

As shown in FIG. 5, the clip 30 of this embodiment, which is made of one piece of steel spring plate strip and is rather narrower than cross-width of the strut-bridge 23a, is bent and enfolded in U or C shape and resiliently clips on the strut-bridge 23a.

One leg 31 of a pair of facing legs 31, 32 which abuts against the outer surface of the strut-bridge 23a has a positioning hole 31a as a female portion to freely fit on the convex 23i of the strut 23. The other leg 32 which abuts against an inner surface of the strut-bridge 23a has an engaging convex 32a as a male portion, which projects toward one leg 31 and fits in a concave 23k of the strut 23, and a positioning portion 32b, which is formed by bending an end area thereof to greatly project in a direction to depart from one leg 31.

The engaging convex 32a and the positioning hole 31a of the clip 30 individually fit in the concave 23k and on the convex 23i, which are formed on the inner and outer surfaces of the strut-bridge 23a, thereby positioning the clip 30 on different positions on the strut-bridge 23a.

When the clip 30 clips on the strut-bridge 23a as fitting the engaging convex 32a as the male potion in the concave 23k as the female portion, the peripheral surface of the brake lever 24 directly abuts against the strut-bridge 23a to restrict the rotation of the brake lever 24. Also, the clip 30 slides to fit the positioning hole 31a as the female portion on the convex 23i as the male portion, the peripheral surface of the brake lever 24 abuts against the positioning portion 32b of the clip 30 to restrict the rotation of the brake lever 24. That is, in this example, by sliding the clip 30 clipping on the strut-bridge 23a forward and backward, the brake lever 24 is able to shift an allowable rotational position (rotation angle) thereof in the cable releasing direction in two stages (two positions).

Figure 8:
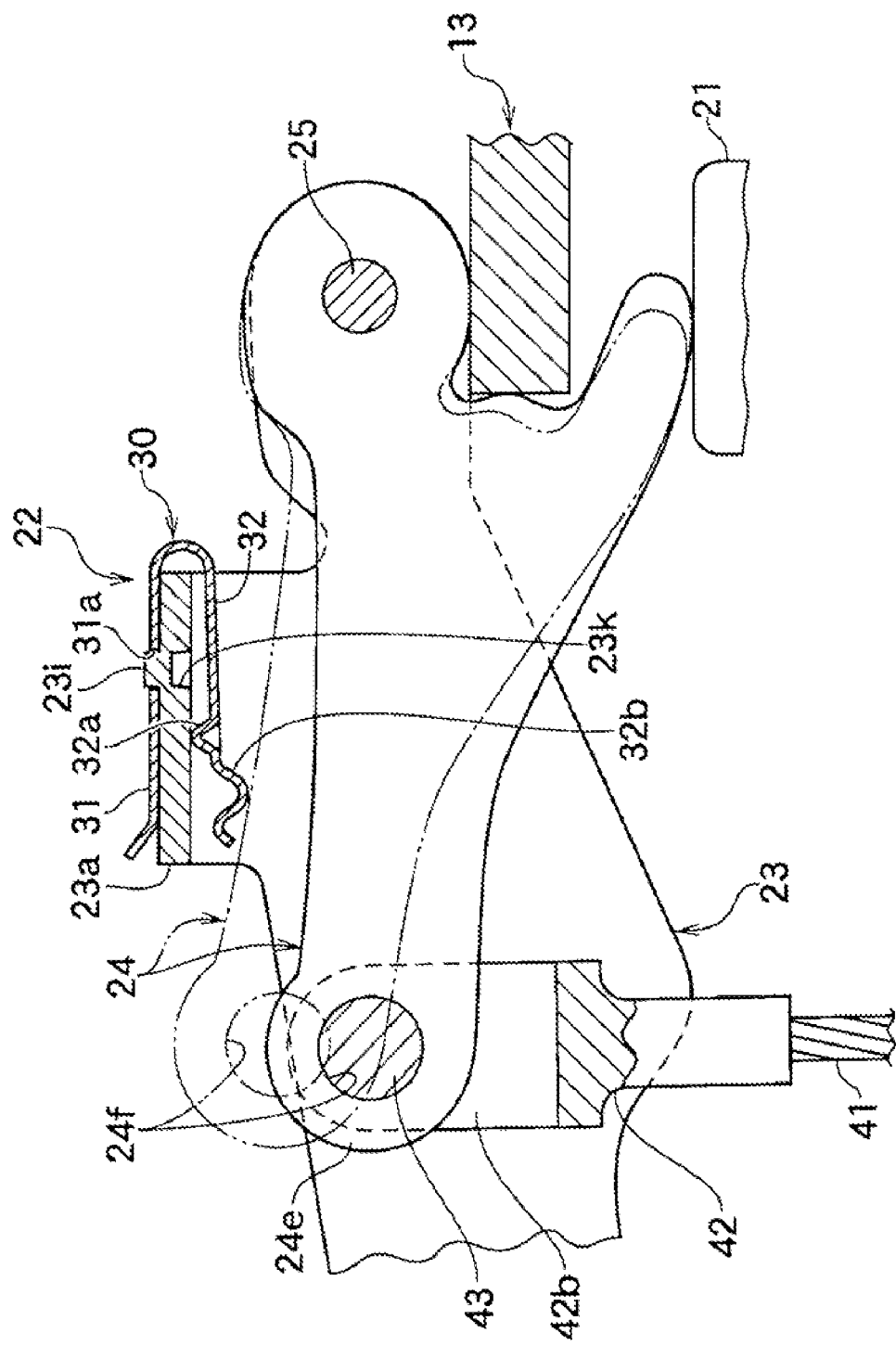
FIG. 8 is an enlarged view of mechanical brake actuator operation according to the first embodiment, which illustrates the condition that the clip disabling the brake lever rotation in the cable releasing direction.

The amount/distance of projection of the positioning portion 32b of the clip 30 and the brake lever 24 are interrelated so that when the engaging convex 32a of the clip 30 fits in the concave 23k formed on the inner surface of the strut-bridge 23a to restrict the rotation of the brake lever 24, the entire brake cable connecting hole 24f of the brake lever 24 is to be exposed out from the wider space 23c of the strut 23, and when the positioning hole 31a of the clip 30 fits on the convex 23i formed on the outer surface of the strut-bridge 23a to restrict the rotation of the bake lever 24, one part of the brake cable connecting hole 24f formed in the free end 24e of the brake lever 24 is positioned in the wider space 23c of the strut 23, thereby preventing the disengagement of the connecting pin 43 (see FIG. 8).

In order to advance an opening of the clip 30 to a side end of the strut-bridge 23a smoothly, the ends of both legs 31, 32 should be bent to spread out from each other, however, such an configuration is not necessary.

The brake cable 40 illustrated in FIG. 2 and FIG. 3 is comprised of the inner cable 41 and an outer casing 44.

Figure 6:
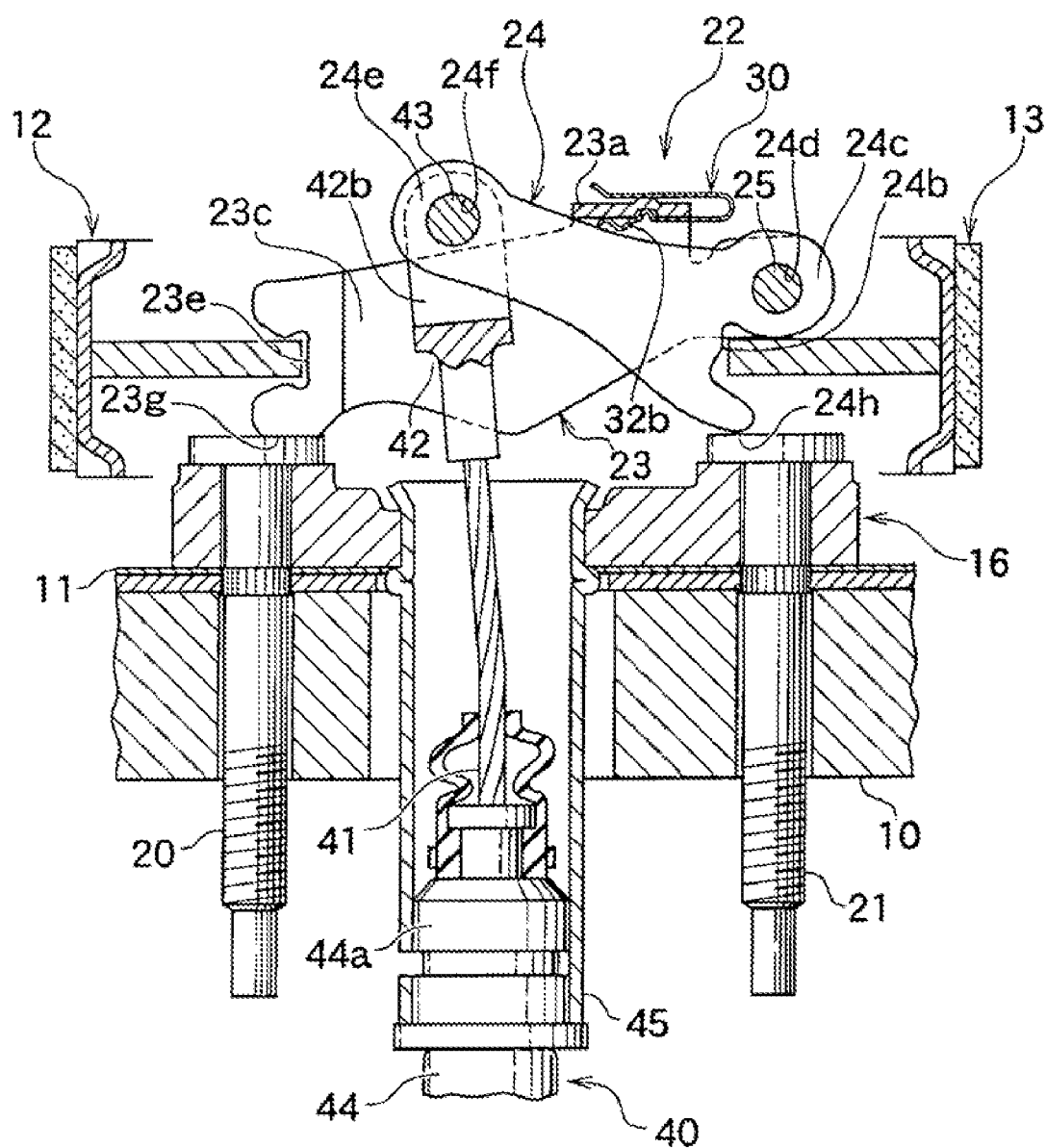
FIG. 6 is an explanatory view of the mechanical brake actuator structure and operation according to the first embodiment, which illustrates the condition where the free end of the brake lever is exposed out from the opening of the space of the strut in the cable releasing direction side.
Figure 7:
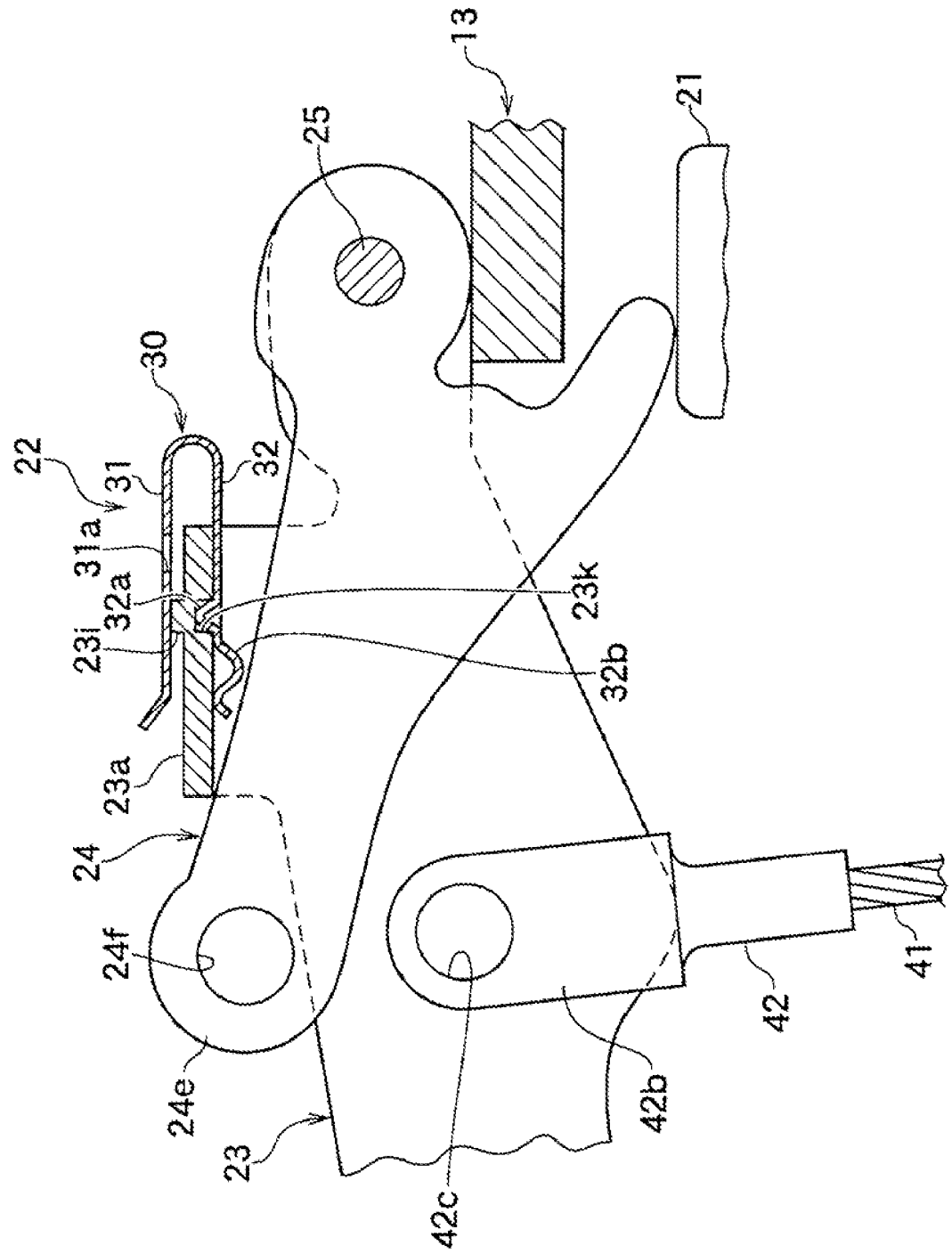
FIG. 7 is an enlarged view of the mechanical brake actuator structure and operation according to the first embodiment, which illustrates the condition that the free end of the brake lever is exposed out from the opening of the space of the strut in the cable releasing direction side.

A process of connecting the brake cable will be explained next. FIG. 6 is a view of the condition of the mechanical actuator 22 after connecting the brake cable 40 to the brake lever 24, and FIG. 7 is an enlarged view of the condition of the mechanical actuator 22 before connecting the brake cable 40 to the brake lever 24. The legs 32, 31 of the clip 30 clip the inner and outer surfaces of the strut-bridge 23a, and the engaging convex 32a fits in the concave 23k formed on the inner surface of the strut-bridge 23a for positioning. The clip 30 is positioned at an fitting section between the engaging convex 32a and the concave 23k while the lateral movement is restricted with light abutment between both side ends of the other leg 32 and sleeves of both sides of the strut-bridge 23a, thereby providing the stable positioning.

The positioning portion 32b of the clip 30 moves back to a position close to the concave 23k of the strut-bridge 23a, thereby no interfering the positioning portion 32b to the brake lever 24.

Accordingly, while the clip 30 is moved back relative to the strut-bridge 23a and is positioned there, the rotational range toward the cable releasing direction of the brake lever 24 is restricted at the position where an intermediate portion of the brake lever 24 abuts against the strut-bridge 23a. (See FIG. 7)

At this time, the free end 24e of the brake lever 24 projects out toward the cable releasing direction side from the opening of the wider space 23c of the strut 23, and the entire brake cable connecting hole 24f is exposed from the opening of the strut 23.

(See FIG. 7)

The inner cable 41 is pinched by fingers to be inserted in a guide pipe 45, and the cable end 42 fixed at the end of the inner cable 41 passes through the wider space 23c of the strut 23 to reach the free end 24e of the brake lever 24.

Under the condition that the free end 24e of the brake lever 24 is positioned between a pair of end-legs 42b, 42b formed in the cable end 42 and that a cable end connecting holes 42c, 42c and the brake cable connecting hole 24f are aligned, the connecting pin 43 is inserted in and through to establish the connection between the brake lever 24 and the cable end 42.

When the cable end 42 is connected to the brake lever 24, as a right end of the clip 30 is pushed toward the free end 24e of the brake lever 24 to approach thereto as shown in FIG. 8, the clip 30 releases the engagement between the engaging convex 32a and the concave 23k formed on the inner surface of the strut-bridge 23a. When the clip 30 is further pushed, the positioning hole 31a formed in a clip 30 fits on the convex 23i formed on an outer surface of the strut-bridge 23a, and the positioning is completed at the position where the clip 30 is forwarded relative to the strut-bridge 23a. Finally, a casing cap 44a of the outer casing 44 is fixed at the other end of a guide pipe 45 with a ring 46. (See FIG. 2)

As the clip 30 slides to shift the clipping position to a position close to the free end 24e of the brake lever 24, the positioning portion 32b also approaches to the free end 24e of the brake lever 24. Accordingly thereafter, if the brake lever 24 rotates in the cable releasing direction, the brake lever 24 abuts against the positioning portion 32b of the clip 30, thereby restricting the further rotation thereof. (See FIG. 8) At this time, an allowable rotational range of the brake lever 24 is smaller than the case that the brake lever 24 abuts against the strut-bridge 23a as shown in FIG. 7. As such, the connecting pin 43 is constantly positioning in the wider space 23c of the strut 23, and the cable end 42 will not physically be disengaged from the brake lever 24.

Also, when the cable end 42 needs to be disengaged from the brake lever 24 for exchanging the brake cable 40, the clip 30, while clipping on the strut-bridge 23a, is moved backward to the pivotal side of the brake lever 24, and the brake lever 24 is rotated in the cable releasing direction, thereby enabling to remove the connecting pin 43 easily.

In this example, the convex 23i and the concave 23k can be formed by a simple press work of the strut-bridge 23a only, and high accuracy in manufacturing the strut 23 as required in the conventional technology is not necessary. Also, the clip 30 attaches to the strut-bridge 23a, and unlike the conventional technology, does not interfere with nearby parts such as shoe return spring adjacent to the strut 23, thereby designing the entire width of the strut 23 narrower. Therefore, operability of attaching the clip 30 remarkably increases. Furthermore, the amount of spring steel usage for forming the clip 30 can be minimized, which is economical.

Figure 10:
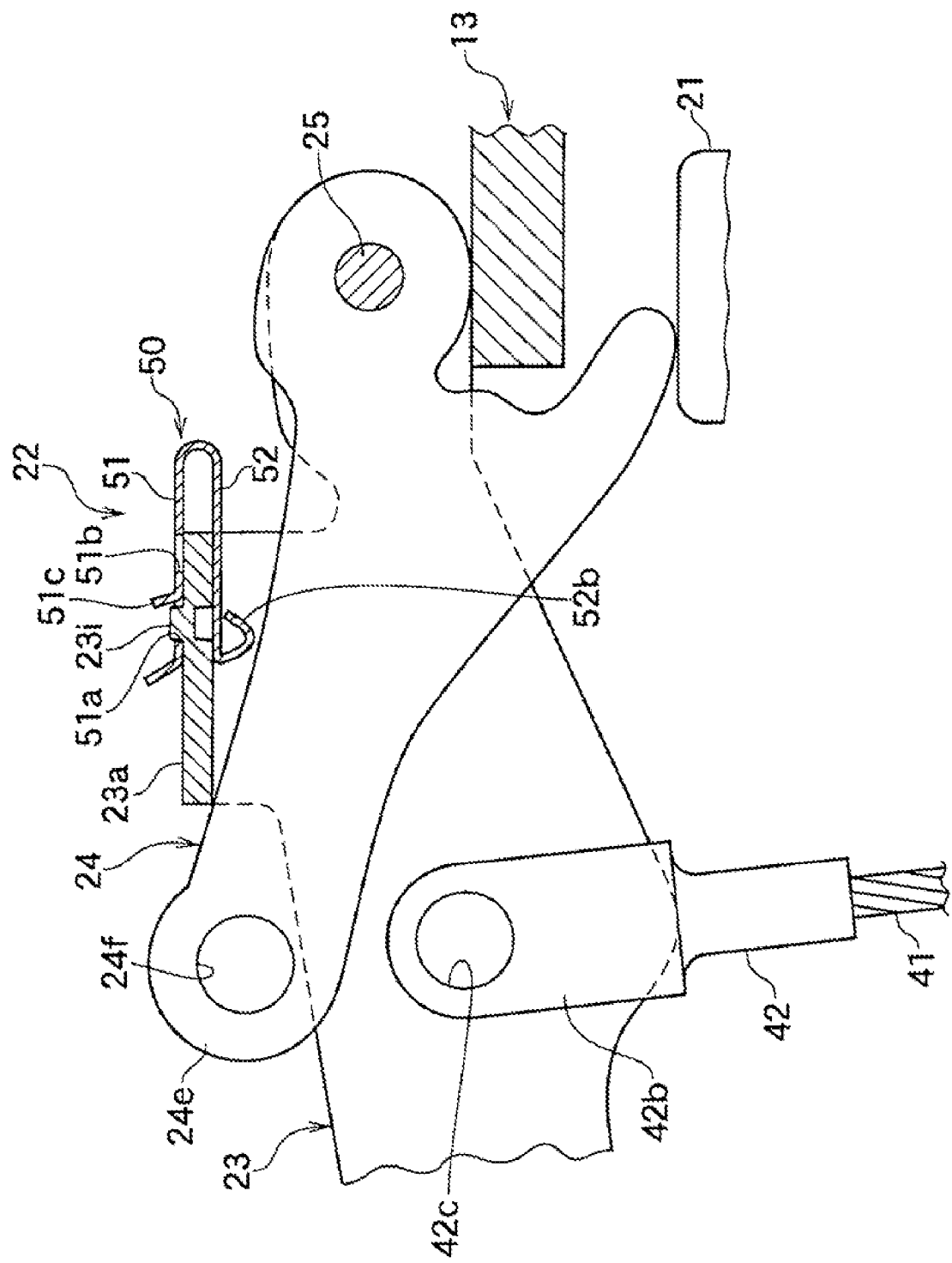
FIG. 10 is an enlarged view of the mechanical brake actuator structure and operation according to the second embodiment, which illustrates the condition that the free end of the brake lever is exposed out from the opening of the space of the strut in the cable releasing direction side.
Figure 11:
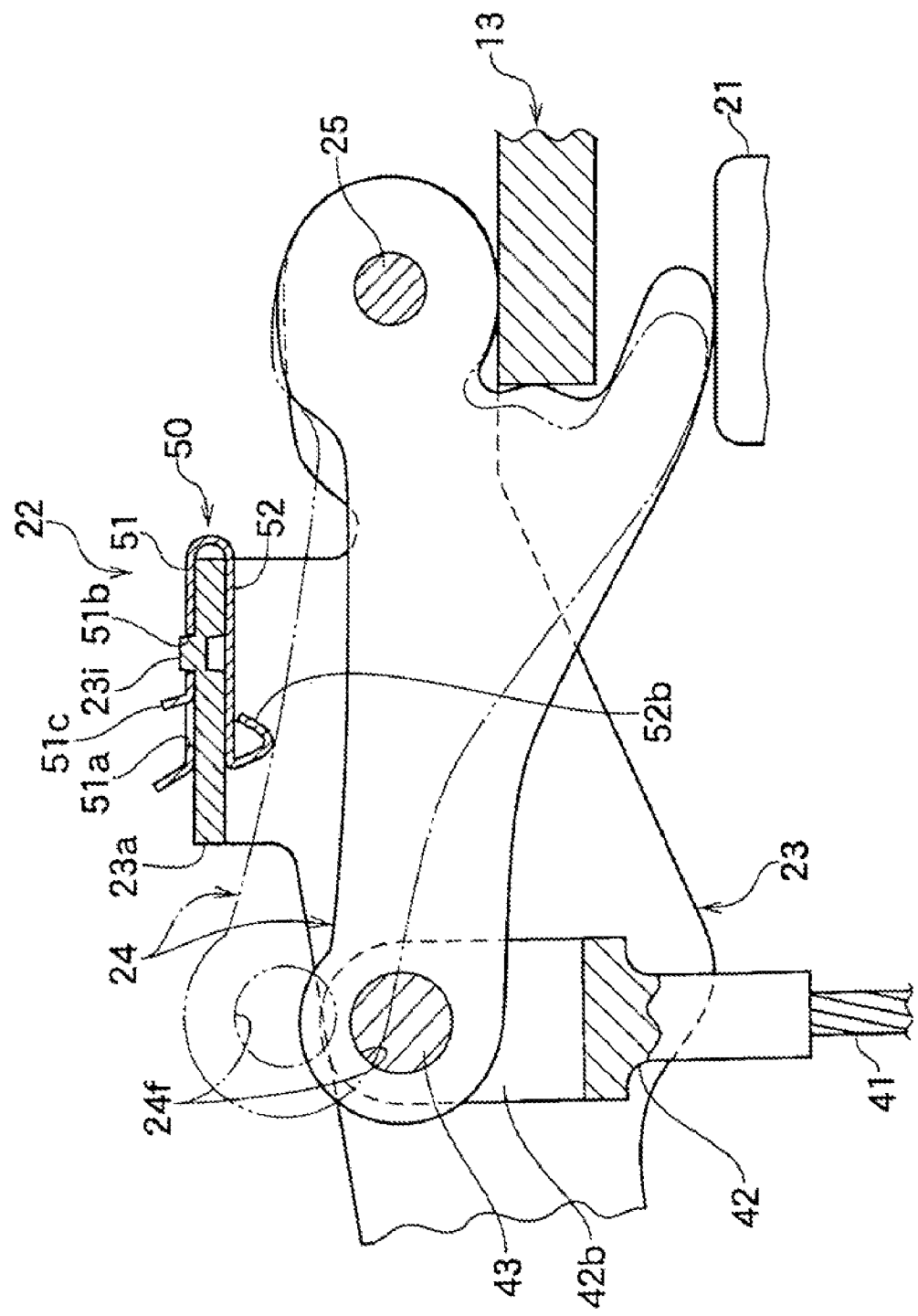
FIG. 11 is an enlarged view of mechanical brake actuator operation according to the second embodiment, which illustrates the condition that the clip disabling the brake lever rotation in the cable releasing direction.

In the following section, the mechanical brake actuator relating to the second embodiment will be explained with reference to FIGS. 9-11.

Figure 9:
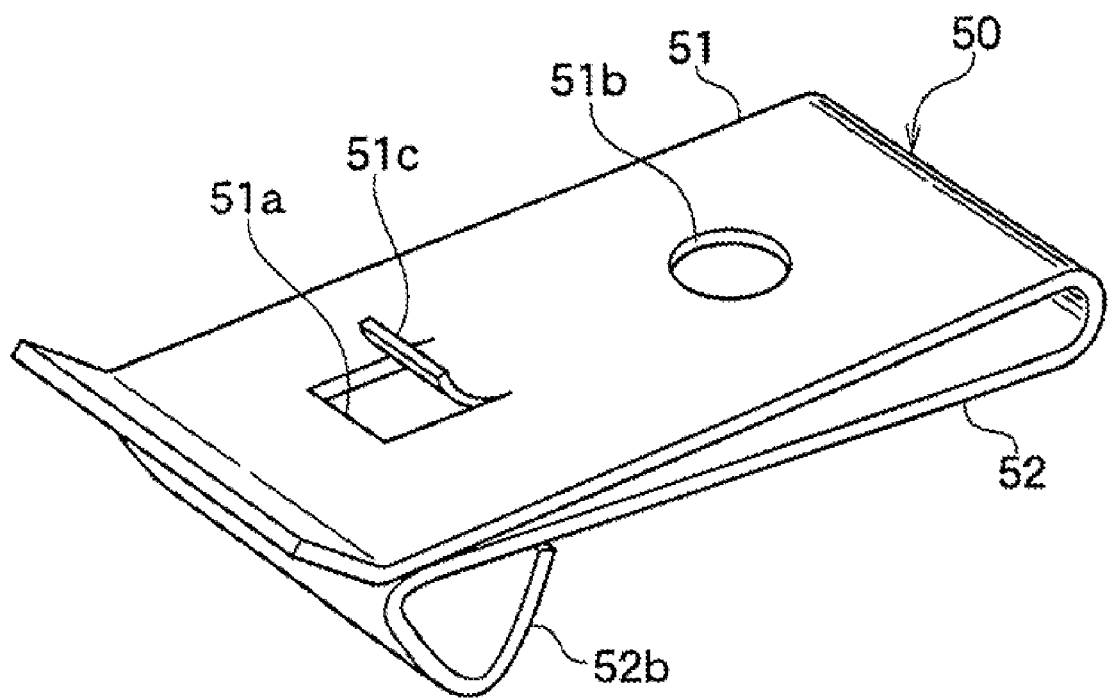
FIG. 9 is a perspective view of the clip according to the second embodiment.

The clip 50, which is used in this second embodiment, as shown in FIG. 9, has one leg 51 abutting against the outer surface of the strut-bridge 23a which has a rectangular first positioning hole 51a and a circular second positioning hole 51b, which are formed with a predetermined interval therebetween in the longitudinal direction of the clip 50. An inner edge of the first positioning hole 51a at a side of the second positioning hole 51b is cut and curved up to form a guide 51c.

The guide 51c at the inner edge of the first positioning hole 51a, when the clip 50 is pushed in, functions so that the convex 23i of the outer surface of the strut-bridge 23a may project out from the first positioning hole 51a smoothly as being guided on the guide 51c, and the first positioning hole 51a with a round inner circumferential surface may be used instead of the guide 51c. This guide 51c makes the slide of the clip 50 easy.

In the process of attaching the clip 50, as described in the first embodiment, the clip 50 is pressed to attach to the strut-bridge 23a from the side of the brake lever pivot hole of the strut-bridge 23a, and a resilient force of the clip 50 is utilized to clip on the strut-bridge 23a.

After attaching the clip 50, the strut 23 is positioned by fitting the first positioning hole 51a of the clip 50 relative to the convex 23i on the outer surface of the strut-bridge 23a. Accordingly, the rotatable range of the brake lever 24 in the cable releasing direction is restricted by the position where the brake lever 24 abuts against the strut-bridge 23a. (See FIG. 10) When the brake lever 24 abuts against the strut-bridge 23a, the entire brake cable connecting hole 24f formed in the free end 24e of the brake lever 24 is designed to be re-exposed out from the opening of the strut 23, thereby facilitating the connection of the brake lever 24 and the cable end 42 as inserting the connecting pin 43.

When the connection between the brake lever 24 and the cable end 42 is completed, the clip 50 is further pushed to fit the second positioning hole 51b on the convex 23i on the outer surface of the strut-bridge 23a to change a clipping position of the clip 50 to nearby position of the free end 24e of the brake lever 24. (See FIG. 11) As the clipping position of the clip 50 is changed, the positioning portion 52b of the clip 50 approaches the free end 24e of the brake ever 24, and as a result, the rotatable range of the brake lever 24 is restricted at a point of abutment with the brake lever 24 and the positioning portion 52b formed at the end of the other leg 52. Accordingly thereafter, the rotation of the brake lever 24 is restricted by the positioning portion 52b of the clip 50, and the connecting pin 43 is constantly positioning in the wider space 23c of the strut 23, so that the cable end 42 would not physically be disengaged from the brake lever 24.

In this example, in addition to the same advantages as described in the first embodiment, there is an advantage of manufacturing of the strut 23 being simple because only a process of forming the convex 23i on the strut-bridge 23a is required.

The mechanical brake actuator relating to the third embodiment will be explained with reference to FIG. 12 and FIG. 13.

This example shows not only the case that the clip 60 made of one piece of spring steel by simply press work resiliently fits on the upper and lower surfaces of the strut-bridge 23a but also the case that the clip 60 enfolds the strut-bridge 23a.

The clip 60 in this example has the pair of legs 61, 62, entire length of which is longer than the lateral width of the strut-bridge 23a, and one leg 61 has a folded portion 61d bending at an edge of the strut-bridge 23a as extending beyond therefrom. The other leg 62 has the positioning portion 62d, which is defined by an extended portion of the other leg 62 bending from an edge of the strut-bridge 23a as extending beyond therefrom toward a direction to spread apart from one leg 61. The clip 60 of this example functions not only to enfold the strut-bridge 23a by cooperating the positioning portion 62b and the folded portion 61d but also to act as a stopper restricting the rotation of the brake lever 24 in the cable releasing direction. Therefore, in the condition that the clip 60 is enfolding the strut-bridge 23a, the amount/distance of extension of the positioning portion 62b and the brake lever 24 are interrelated so as to restrict the rotation of the brake lever 24 in the cable releasing direction as the positioning portion 62b interferes with the brake lever 24 at the position where the entire brake cable connecting hole 24f of the brake lever 24 is not exposed out from the opening of the strut 23.

Figure 12:
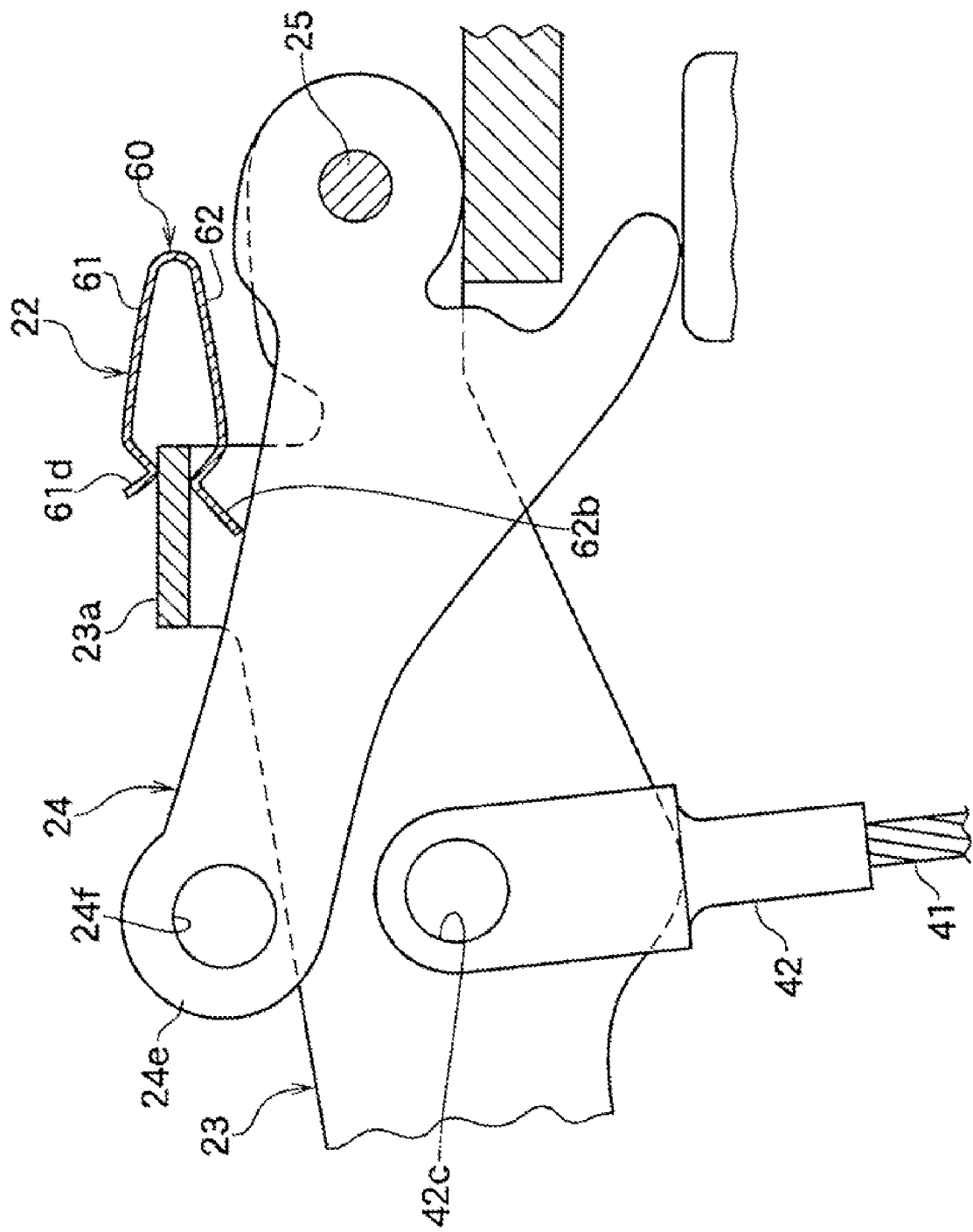
FIG. 12 is an enlarged view of the mechanical brake actuator structure and operation according to the third embodiment, which illustrates the condition that the free end of the brake lever is exposed out from the opening of the space of the strut in the cable releasing direction side.
Figure 13:
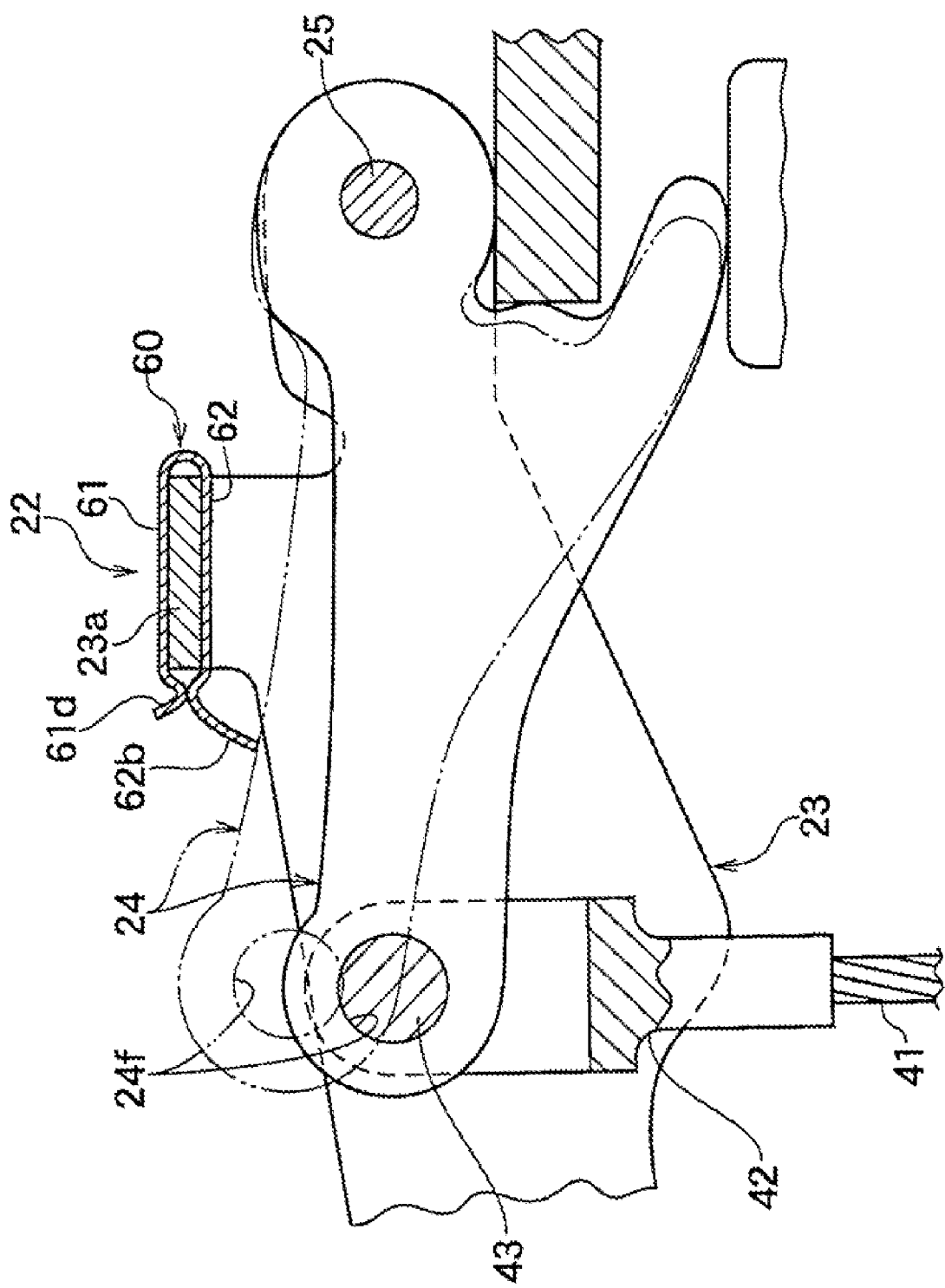
FIG. 13 is an enlarged view of mechanical brake actuator operation according to the third embodiment, which illustrates the condition that the clip disabling the brake lever rotation in the cable releasing direction.

In this example, before attaching the clip 60 to the strut-bridge 23a, the connecting pin 43 is inserted to connect the brake lever 24 and the cable end 42 or the cable end 42 is connected to the brake lever 24 while the clip 60 is clipping only a predetermined amount of the strut-bridge 23a at the position where the entire brake cable connecting hole 24f is exposed out from the opening of the strut 23 as shown in FIG. 12. After the connecting pin 43 is inserted to connect the cable end 42 and the brake lever 24, the clip 60 is pushed deep over to enfold the strut-bridge 23a as shown in FIG. 13. After attaching the clip 60 to the strut-bridge 23a, the positioning portion 62b can restrict the rotation of the brake lever 24 in the cable releasing direction, and therefore the connecting pin 43 constantly positions in the wider space 23c of the strut 23, and the cable end 42 does not physically disengage from the brake lever 24.

In this example, in addition to the same advantages of the above described first embodiment, no processing is necessary to be done on the strut 23 and no hole is necessary to be formed on the clip 60, where the bending process is necessary, thereby offering an advantage to reduce the number of steps for manufacturing.

Figure 14:
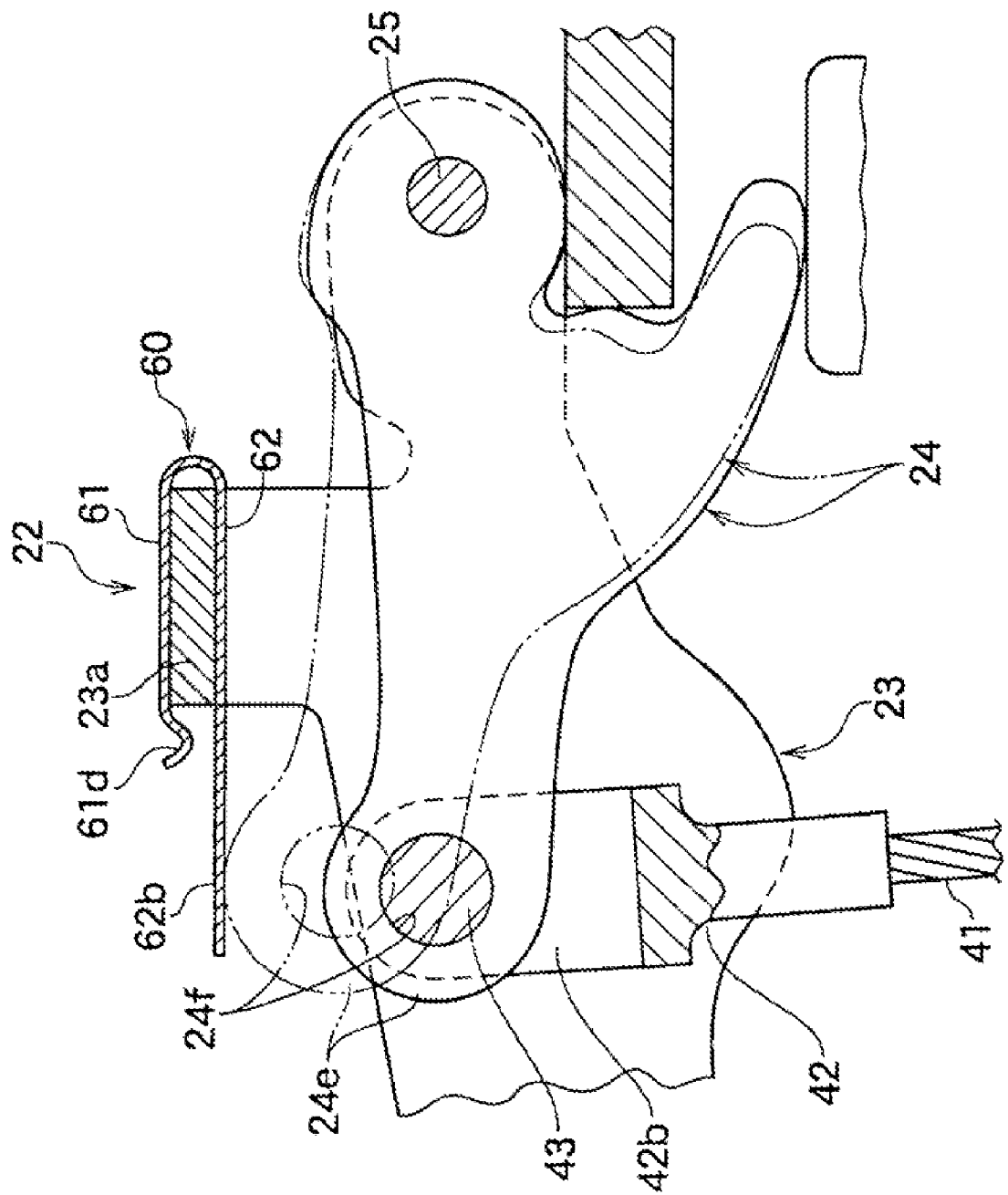
FIG. 14 is an enlarged view of mechanical brake actuator structure and operation according to a modification of the third embodiment, which illustrates the condition that the clip disabling the brake lever rotation in the cable releasing direction.

A modification to the mechanical brake actuator of the third embodiment will be explained with reference to FIG. 14. The clip 60 in this example extends the other leg 62 toward the free end 24e of the brake lever 24 so as to form the positioning portion 62b without bending the same and extends one leg 61 as bending the same to form the folded portion 61d and to extend further therefrom so as to form the positioning portion 62b, wherein the positioning portion 62b abuts against a peripheral surface of the free end 24e of the brake lever 24, and the brake lever 24, after connecting the cable end 42 to the brake lever 24, is restricted its rotation in the cable releasing direction. In this example, as in the previous third embodiment, the pair of the legs 61, 62 resiliently fit on the strut-bridge 23a by the spring force of the legs 61, 62, and also the folded portion 61d formed by bending one legs 61 travels over the strut-bridge 23a to abut against the end surface thereof, thereby the clip 60 enfolding the strut-bridge 23a. Although this example illustrates the case in which the positioning portion 62b of the clip 60 abuts against the peripheral surface of the free end 24e of the brake lever 24, the positioning portion 62b formed as extending on an extension line of the other leg 62 may abuts against an intermediate portion of the brake lever 24.

Also, although the above-described embodiment illustrates the case in which the clip 60 is inserted from the side of the brake lever pivotal portion of the strut-bridge 23a, the clip 60 may be inserted from the side of the strut superposing portion of the strut-bridge 23a.

The mechanical brake actuator with regard to the fourth embodiment will be explained with reference to FIG. 15.

Figure 15:
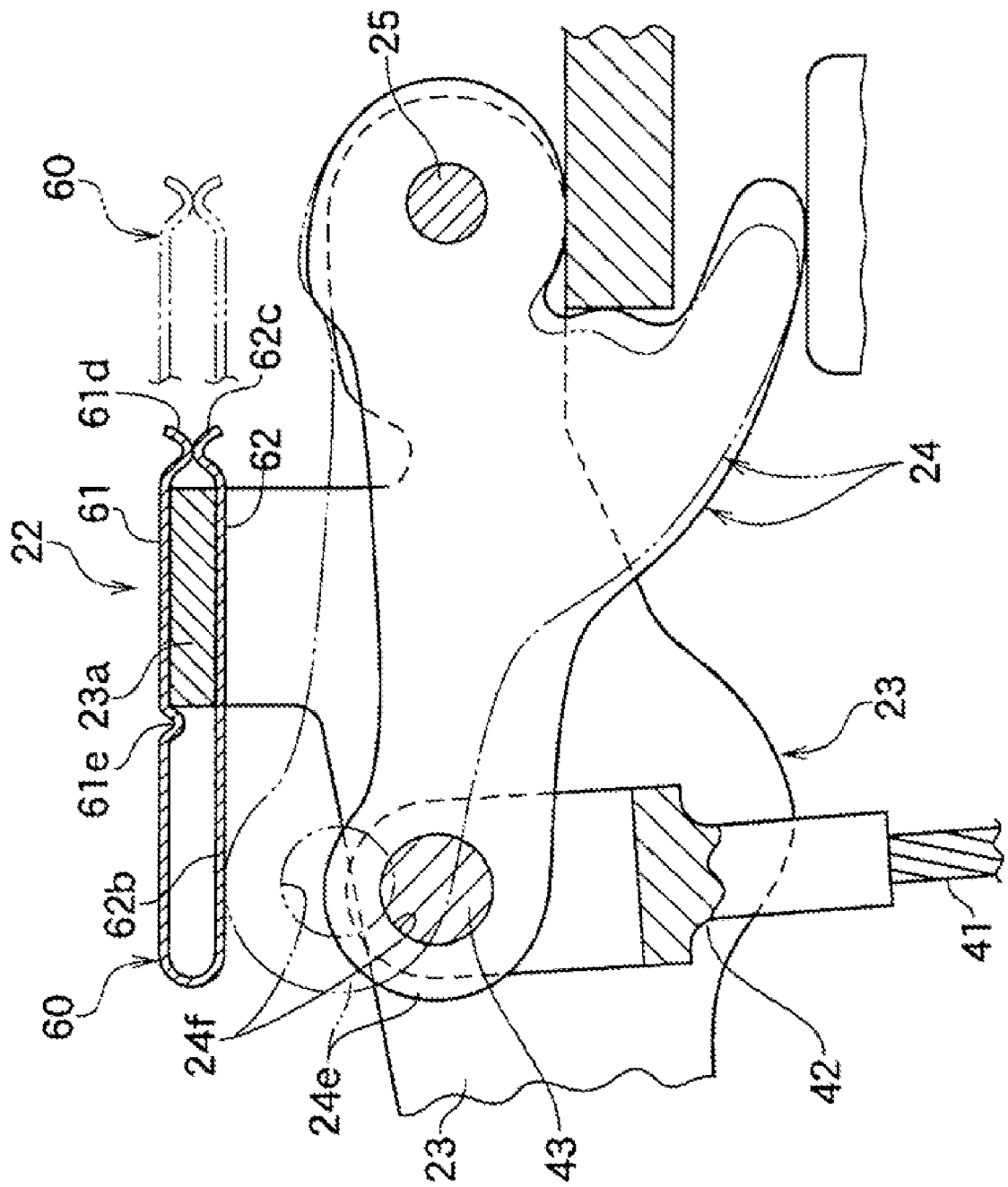
FIG. 15 is an enlarged view of mechanical brake actuator structure and operation according to the fourth embodiment, which illustrates the condition that the clip disabling the brake lever rotation in the cable releasing direction.

The clip 60 as shown in FIG. 15 has the pair of the legs 61, 62 with the entire length longer than the lateral width of the strut-bridge 23a and is designed such that positioning on the strut-bridge 23a is accomplished by the folded portions 61d, 62c formed by bending both legs 61, 62 around both ends and a positioning protrusion 61e formed on one of or both legs 61, 62. Furthermore, the clip 60 has an extending portion of the other leg 62 extending leftward from the positioning protrusion 61e, which functions as the positioning portion 62b.

As the entire length of the clip 60 is set about two times longer than the lateral width of the strut-bridge 23a and the positioning protrusion 61e is formed in the intermediate position thereof, the clip 60 may be deflected leftward or rightward in the figure relative to the strut-bridge 23a for positioning.

When the clip 60 clips on the strut-bridge 23a, the pair of legs 61, 62 of the clip 60 is advanced from left relative to the strut-bridge 23a, and the clip 60 is advanced deep enough for the positioning portion 62b to abut against the inner surface of the strut-bridge 23a (see the clip 60 shown in two-dot chain line of FIG. 15), the positioning protrusion 61e abuts against the side end surface of a right side of the strut-bridge 23a to enfold thereof.

The amount/distance of extension of the positioning portion 62b and the brake lever 24 are interrelated so that when the clip 60 deflects leftward in the figure relative to the strut-bridge 23a, the rotation of the brake lever 24 in the cable releasing direction is restricted as the positioning portion 62b interferes the brake lever 24 at the position where the entire brake cable connecting hole 24f of the brake lever 24 is not exposed out from the opening of the strut 23. Also, the clip 60 is interrelated with the strut-bridge 23a so that when the clip 60 is deflected rightward in the figure relative to the strut-bridge 23a, the entire brake cable connecting hole 24f of the brake lever 24 becomes exposed out from the opening for inserting the connecting pin 43 to connect the brake lever 24 and the cable end 42.

Upon completion of the connection between the brake lever 24 and the cable end 42, the clip 60 is pushed leftward in the figure as shown in a solid line of FIG. 15 to slide to position on the strut-bridge 23a by the folded portions 61d, 61c of both ends of both legs 61, 62 and the positioning protuberance 61e. By sliding the clip 60 to position on the strut-bridge 23a, the positioning portion 62b formed on the clip 60 projects toward the free end 24e side of the brake lever 24, and therefore the brake lever 24 interferes with the positioning portion 62b to restrict the rotation of the brake lever 24 in the cable releasing direction.

The mechanical brake actuator relating to the fifth embodiment will be explained with reference to FIG. 16 and FIG. 17. This embodiment illustrates an example of the clip 70 rotatably attached on the strut-bridge 23a, and connecting operation of the brake cable 40, the brake lever 24, and the connecting pin 43 is possible when the clip 70 is at the position in the cable releasing direction side, the clip 70 restricts the rotation of the brake lever 24 to disable connecting operation of the brake cable 40, the brake lever 24, and the connecting pin 43 when the clip 70 is at the position in the cable operating direction side. In other words, this embodiment is structured such that when the clip 70 is at the position in the cable releasing direction side, once the brake cable 40, the brake lever 24, and the connecting pin 43 are connected, if the clip 70 is at the position in the cable operating direction side, the connection among the three cannot be disengaged.

Figure 16:
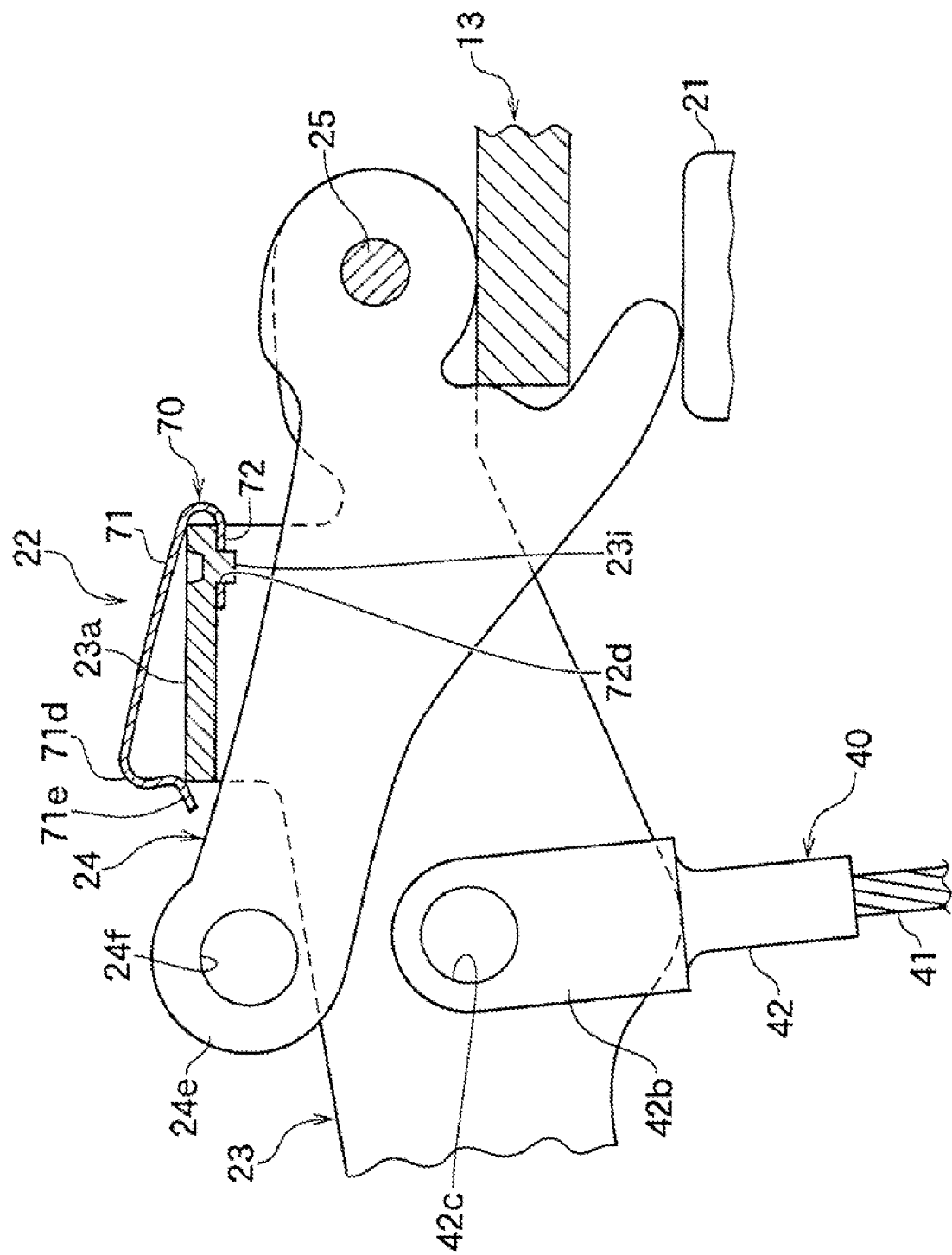
FIG. 16 is an enlarged view of the mechanical brake actuator structure and operation according to the fifth embodiment, which illustrates the condition that the free end of the brake lever is exposed out from the opening of the space of the strut in the cable releasing direction side.
Figure 17:
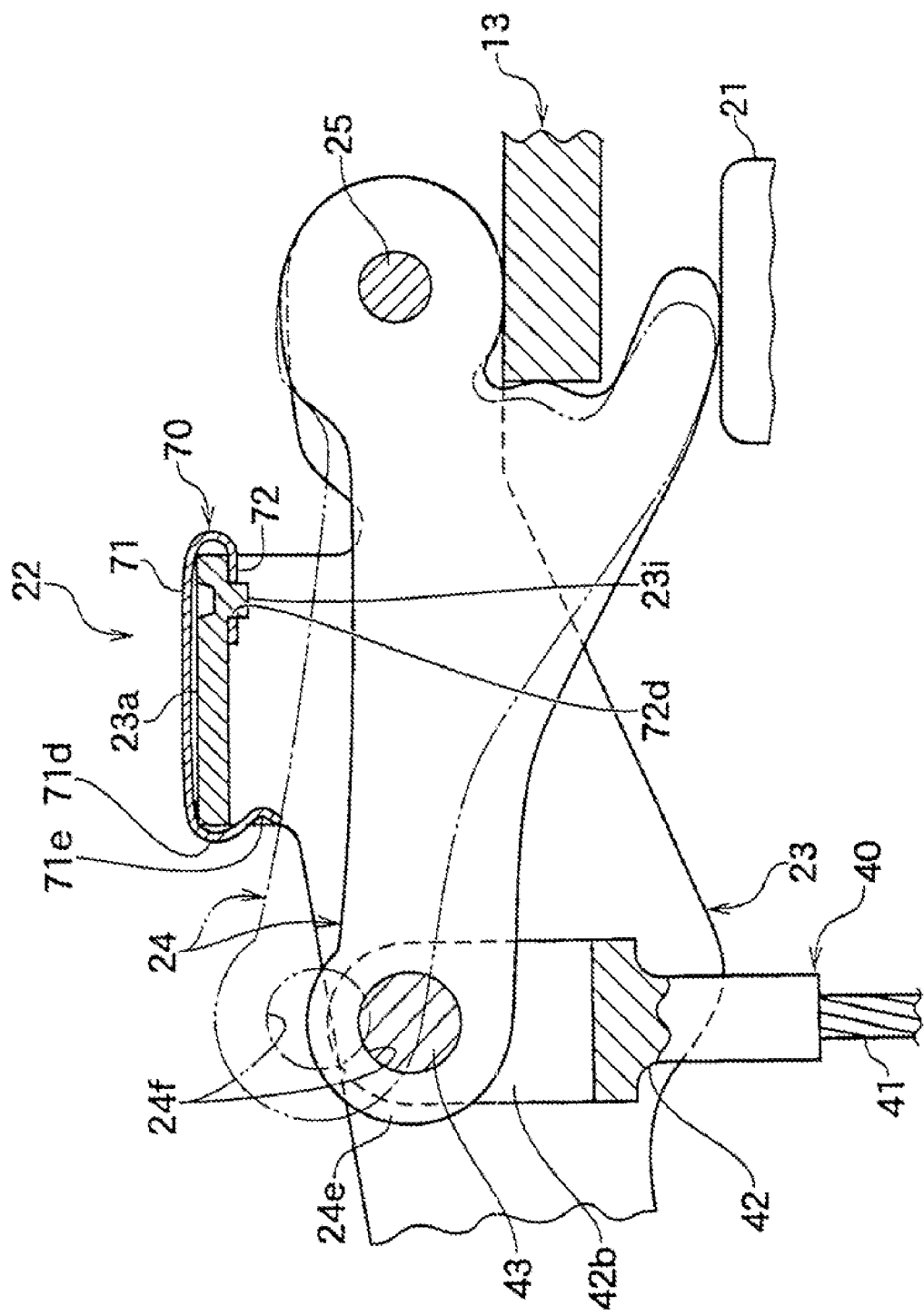
FIG. 17 is an enlarged view of the mechanical actuator operation according to the fifth embodiment, which illustrates the condition that the clip disabling the brake lever rotation in the cable releasing direction.

More concretely, the clip shown in FIGS. 16 and 17 is such that the other leg 72 of the pair of facing legs 71, 72, which abuts against the inner surface of the strut-bridge 23a, is designed shorter than the one leg 71, and has the positioning hole 72d as a female portion, which positions as making the male and female fitting with the convex 23i formed on the inner surface of the strut-bridge 23a.

The one leg 71 is extended beyond the length of the strut-bridge 23a, and the extended portion is bent to form a folded portion 71d abuttable against the front end (left end in the figure) of the strut-bridge 23a and at the same time to form the positioning portion 71e after the folded portion 71d. This positioning portion 71e abuts against the free end 24e of the brake lever 24 so as to restrict the rotation of the brake lever 24 in the cable releasing direction after connecting the cable end 42 with the brake lever 24.

When the clip 70 attaches on the strut-bridge 23a, the pair of the legs 71, 72 are inserted rearward relative to the strut-bridge 23a (from right side of the figure) to slid the clip 70 deeply thereover, and the positioning hole 72d of the other leg 72 fits over the convex 23i formed on the inner surface of the strut-bridge 23a, thereby making the male and female engagement to position the clip 70.

Entire length of one leg 71 of the clip 70 is designed such that the folded portion 71d formed at the free end thereof, unless forced pressure is applied thereto, abuts against the front end (left end of the figure) of the strut-bridge 23a, and one leg 71 maintain the position in the cable releasing direction side. The folded portion 71d, when the forced pressure is applied to rotate one leg 71, is designed to clip the front end (left end of the figure) of the strut-bridge 23a between a flat/straight surface and the folded portion 71d of one leg 71. Accordingly, the resilient deforming force of the folded portion 71d becomes a clipping force of the clip 70

Also, the length of extension of the positioning portion 71e of the clip 70 and the strut-bridge 23a is interrelated such that when one leg 71 of the clip 70 is at the position in the cable releasing direction side, the entire brake cable connecting hole 24f of the brake lever 24 is exposed out from the opening of the strut 23.

The length of extension of the positioning portion 71e and the brake lever 24 is interrelated such that when one leg 71 is at a position in the cable operating direction side by force-pushing one leg 71 to approach the outer surface of the strut-bridge 23a, the positioning portion 71e abuts against the peripheral edge of the free end 24e, thereby restricting the rotation of the brake lever 24 in the cable releasing direction after connecting the cable end 42 with the brake lever 24.

In addition to the same advantages as described in the first embodiment that can be obtained in this example, the clip 70 can be further downsized and manufactured by the simple bending process, thereby decreasing the material cost and the manufacturing cost of the clip 70. Furthermore, when the clip 70 attaching to the strut-bridge 23a is rotated by fingers to restrict the rotation of the brake lever 24 in the cable releasing direction, the attaching sound and the resulted vibration make an operator to hear and feel the operation, thereby confirming the clip installation.

Modification to the mechanical brake actuator of the fifth embodiment will be explained with reference to FIGS. 18 and 19. This embodiment illustrates an example of the clip 70 rotatably attaching to the front and rear end edges of the strut-bridge 23a, and connecting operation of the brake cable 40, the brake lever 24, and the connecting pin 43 is possible when the clip 70 is at the position in the cable releasing direction side, the clip 70 restricts the rotation of the brake lever 24 to disable connecting operation of the brake cable 40, the brake lever 24, and the connecting pin 43 when the clip 70 is at the position in the cable operating direction side.

Figure 18:
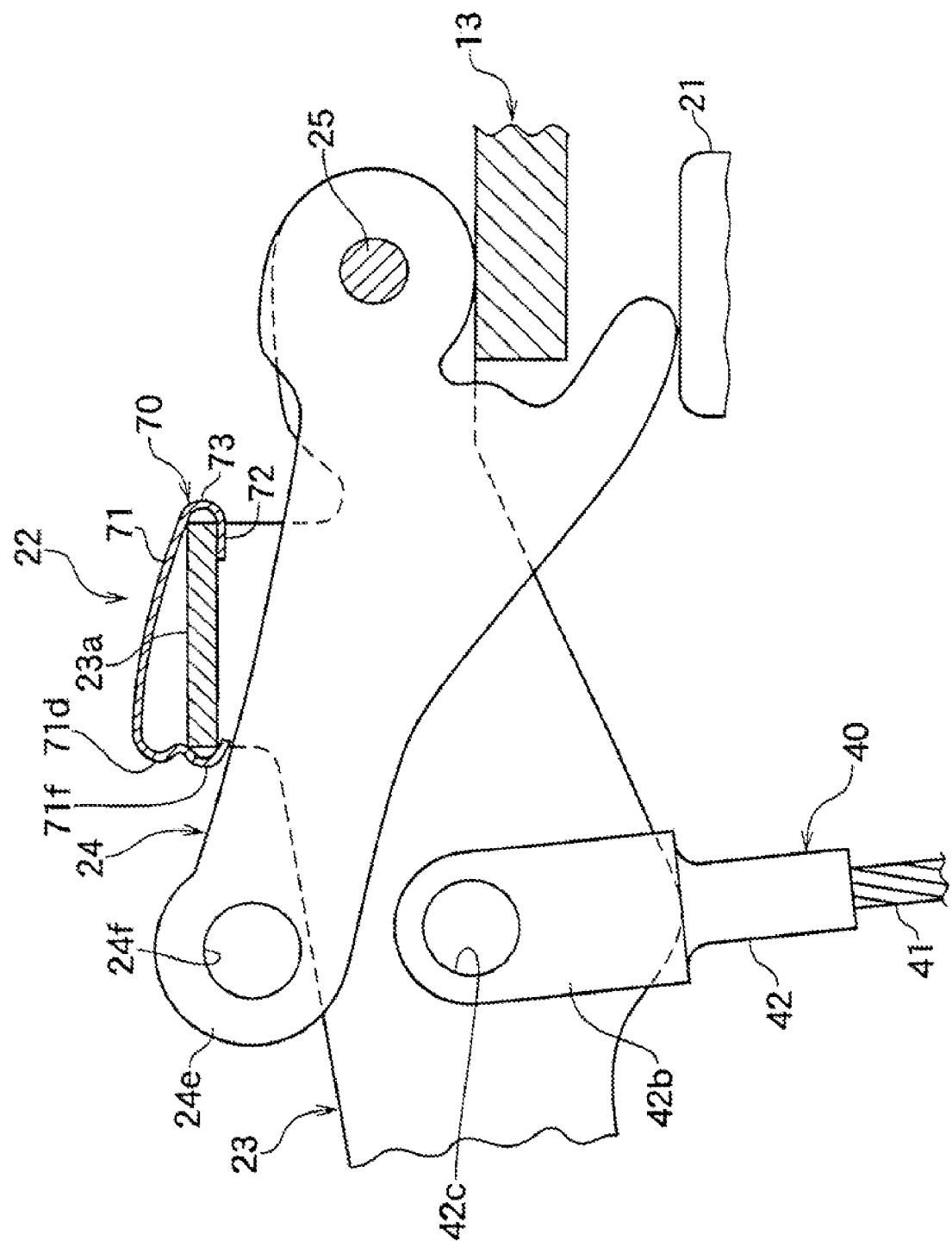
FIG. 18 is an enlarged view of the mechanical brake actuator structure and operation according to a modification of the fifth embodiment, which illustrates the condition that the free end of the brake lever is exposed out from the opening of the space of the strut in the cable releasing direction side.
Figure 19:
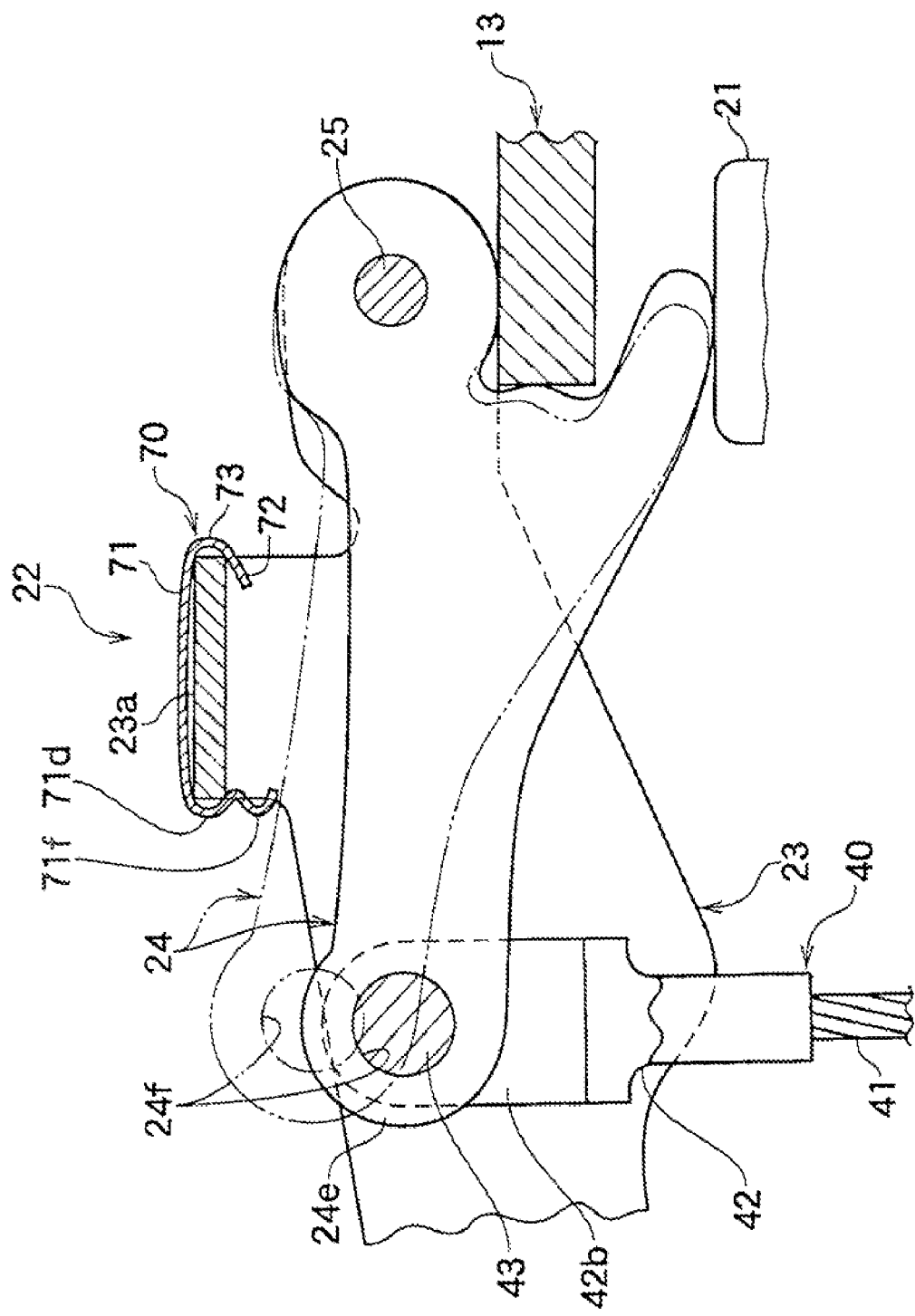
FIG. 19 is an enlarged view of operation of the mechanical actuating mechanism according to a modification of the fifth embodiment, which illustrates the condition that the rotation of the brake lever in the cable releasing direction is disabled by the clip.

More concretely, the clip 70 as shown in FIGS. 18 and 19 has an engagement portion 73 between the pair of facing legs 71 and 72. The other leg 72 abutting against the inner surface of the strut-bridge 23a is designed to be shorter than one leg 71 just like the above-described fifth embodiment, but no positioning hole 72d is necessarily formed and then the other leg 72 can be shorter.

A first folded portion 71d and a second folded portion 71f are continuously formed in waveforms on the free end of one leg 71 extending beyond the strut-bridge 23a, and the clip 70, as co-operating with the engagement portion 73, gradually clips on the front and rear end edges (left and right edges in the figure) of the strut-bridge 23a.

Accordingly, the resilient deforming force of the first and second folded portions 71d, 71f becomes a clipping force of the clip 70 relative to the front and rear end edges (left and right edges in the figure).

The second folded portion 71f in this example also functions as the positioning portion which restricts the rotation of the brake lever 24 in the cable releasing direction.

As shown in FIG. 18, when the second folded portion 71f of the clip 70 engages with the front and rear end edges (left and right edges in the figure) of the strut-bridge 23a, the clip 70 and the strut-bridge 23a is interrelated so that the entire brake cable connecting hole 24f of the bake lever 24 is exposed out from the opening of the strut 23.

As shown in FIG. 19, the length of extension of the second folded portion 71f as the positioning portion and the brake lever 24 is interrelated such that when the first folded portion 71d of the clip 70 is engaged with the front end edge (left edge of the figure) of the bridging portion 23a by force-pushing one leg 71 of the clip 70 to approach the outer surface of the strut-bridge 23a, the second folded portion 71f abuts against the peripheral edge of the free end 24e of the brake lever 24, thereby restricting the rotation of the brake lever 24 in the cable releasing direction after connecting the cable end 42 with the brake lever 24.

The above-described clips 30, 50, 60 and 70 of this invention are not limited to examples of the spring steel clip as long as functioning as a member to attach to the strut-bridge, for example a plastic clip may sufficient.

It is readily apparent that the above-described embodiments have the advantage of wide commercial utility. It should be understood that the specific form of the invention hereinabove described is intended to be representative only, as certain modifications within the scope of these teachings will be apparent to those skilled in the art. Accordingly, reference should be made to the following claims in determining the full scope of the invention.

We claim:

1. A mechanical brake actuator, comprising:
   a strut that has two facing plates with a strut-bridge connecting therebetween and that engages with a first brake shoe;
   a brake lever that engages with a second brake shoe, where said brake lever is retained in a space between said facing plates of the strut and is pivotally supported in the strut at a proximal end thereof; and
   said brake lever and said strut relatively rotate to spread apart from each other while pulling a brake cable connected to a free end of the brake lever via a connecting pin, wherein
   a clip is initially attached to the strut-bridge at a retreat position thereof, and after connecting the brake cable to the brake lever, the entire clip is moved on the strut-bridge in a forwarding direction parallel to said facing plates so as to be lastly attached to the strut-bridge at a progress position thereof, thereby restricting a rotation of the brake lever in a cable releasing direction.

2. The mechanical brake actuator according to claim 1, wherein said clip has a pair of legs that clip on the strut-bridge.

3. The mechanical brake actuator according to claim 1, wherein said clip enfolds said strut-bridge.

4. The mechanical brake actuator according to claim 2, wherein said clip enfolds said strut-bridge.

5. The mechanical brake actuator according to claim 2, wherein said clip has a positioning portion on one of said legs that restricts the rotation of the brake lever in the cable releasing direction by abutting said positioning portion against the brake lever.

6. The mechanical brake actuator according to claim 2, wherein said clip slidably clips on the strut-bridge.

7. The mechanical brake actuator according to claim 6, wherein said clip and said strut-bridge have first and second male and female engagements, and said clip engages said strut-bridge at said first male and female engagement when said clip is at said retreat position and engages said strut-bridge at said second male and female engagement when said clip is at said progress position.

8. The mechanical brake actuator according to claim 6, wherein a connecting operation of the brake cable, the brake lever, and the connecting pin is possible when said clip is at a retreat position, and the clip restricts the rotation of the brake lever so as to disable the connecting operation of the brake cable, the brake lever, and the connecting pin when said clip is at a progress position.

9. The mechanical brake actuator according to claim 7, wherein a connecting operation of the brake cable, the brake lever, and the connecting pin is possible when said clip is at a retreat position, and the clip restricts the rotation of the brake lever so as to disable the connecting operation of the brake cable, the brake lever, and the connecting pin when said clip is at a progress position.

* * * * *